US008005961B2

(12) United States Patent
Tanimoto

(10) Patent No.: US 8,005,961 B2
(45) Date of Patent: *Aug. 23, 2011

(54) RELAY SERVER, RELAY COMMUNICATION SYSTEM, AND COMMUNICATION DEVICE

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 622 days.

This patent is subject to a terminal disclaimer.

(21) Appl. No.: 11/944,495

(22) Filed: Nov. 23, 2007

(65) Prior Publication Data

US 2008/0288591 A1    Nov. 20, 2008

(30) Foreign Application Priority Data

Nov. 24, 2006  (JP) ................................ 2006-316815
Dec. 4, 2006   (JP) ................................ 2006-327158
Dec. 13, 2006  (JP) ................................ 2006-335512

(51) Int. Cl.
*G06F 15/16* (2006.01)

(52) U.S. Cl. ......... 709/227; 709/202; 709/205; 709/207

(58) Field of Classification Search .................. 709/227, 709/202, 205, 207
See application file for complete search history.

(56) References Cited

U.S. PATENT DOCUMENTS

| | | |
|---|---|---|
| 5,224,205 A | 6/1993 | Dinkin et al. |
| 5,535,375 A | 7/1996 | Eshel et al. |
| 5,848,134 A | 12/1998 | Sekiguchi et al. |
| 5,884,312 A | 3/1999 | Dustan et al. |
| 6,061,796 A | 5/2000 | Chen et al. |
| 6,111,883 A | 8/2000 | Terada et al. |
| 6,145,084 A | 11/2000 | Zuili et al. |
| 6,178,427 B1 | 1/2001 | Parker |
| 6,215,877 B1 | 4/2001 | Matsumoto |
| 6,222,536 B1 | 4/2001 | Kihl et al. |
| 6,226,692 B1 | 5/2001 | Miloushev et al. |
| 6,237,023 B1 | 5/2001 | Yoshimoto |
| 6,336,141 B1 | 1/2002 | Fujiyama et al. |

(Continued)

FOREIGN PATENT DOCUMENTS

EP    1 054 547 A2    11/2000

(Continued)

OTHER PUBLICATIONS

Official communication issued in counterpart Japanese Application No. 2006-316815, mailed on Nov. 18, 2008.

(Continued)

*Primary Examiner* — John Follansbee
*Assistant Examiner* — Nghi V Tran
(74) *Attorney, Agent, or Firm* — Keating & Bennett, LLP

(57) ABSTRACT

A relay server that is connected to a LAN and that can communicate with a relay server of a different LAN, includes: an account information registering unit that stores account information including information on client terminals connected to the LAN; a relay group information registering unit that stores relay group information including information on a group of relay servers permitting access to each other; and a shared resource information registering unit that stores shared resource information including information on resources and information on the client terminals sharing the resources, wherein when an operation command for a resource, which can be operated by a client terminal connected to the different terminal, is received from the client terminal stored in the account information registering unit based on the shared resource information, the operation of the resource is relayed on the basis of the relay group information.

14 Claims, 34 Drawing Sheets

U.S. PATENT DOCUMENTS

| | | | |
|---|---|---|---|
| 6,538,773 B1 | 3/2003 | Brossman et al. |
| 6,546,488 B2 | 4/2003 | Dillon et al. |
| 6,564,261 B1 | 5/2003 | Gudjonsson et al. |
| 6,594,246 B1 | 7/2003 | Jorgensen |
| 6,636,513 B1 | 10/2003 | Nishikawa et al. |
| 6,754,212 B1 | 6/2004 | Terada et al. |
| 6,757,365 B1 | 6/2004 | Bogard |
| 6,766,373 B1 | 7/2004 | Beadle et al. |
| 6,889,256 B1 | 5/2005 | Palevich et al. |
| 6,898,641 B1 | 5/2005 | Kobayashi |
| 6,950,879 B2 | 9/2005 | Zhou |
| 6,988,199 B2 | 1/2006 | Toh et al. |
| 7,000,248 B2 | 2/2006 | Mizukoshi |
| 7,120,927 B1 | 10/2006 | Beyda et al. |
| 7,139,811 B2 | 11/2006 | Lev Ran et al. |
| 7,174,378 B2 | 2/2007 | Yoon et al. |
| 7,206,088 B2 | 4/2007 | Tanimoto |
| 7,299,275 B2 | 11/2007 | Tsukidate et al. |
| 2001/0044819 A1 | 11/2001 | Gong |
| 2001/0047414 A1 | 11/2001 | Yoon et al. |
| 2002/0023143 A1 | 2/2002 | Stephenson et al. |
| 2002/0032616 A1* | 3/2002 | Suzuki et al. ............. 705/26 |
| 2002/0073182 A1 | 6/2002 | Zakurdaev et al. |
| 2002/0095506 A1 | 7/2002 | Tanimoto |
| 2002/0118398 A1 | 8/2002 | Tanimoto |
| 2002/0143855 A1 | 10/2002 | Traversat et al. |
| 2002/0143956 A1 | 10/2002 | Tanimoto |
| 2002/0143960 A1 | 10/2002 | Goren et al. |
| 2002/0146002 A1 | 10/2002 | Sato |
| 2002/0152299 A1 | 10/2002 | Traversat et al. |
| 2004/0083385 A1 | 4/2004 | Ahmed et al. |
| 2004/0107272 A1* | 6/2004 | Manukyan ............. 709/221 |
| 2004/0148432 A1 | 7/2004 | Udono et al. |
| 2004/0255048 A1 | 12/2004 | Lev Ran et al. |
| 2005/0076098 A1 | 4/2005 | Matsubara et al. |
| 2006/0083171 A1 | 4/2006 | Tanaike et al. |
| 2006/0149771 A1 | 7/2006 | Kojima et al. |
| 2006/0256771 A1 | 11/2006 | Yarlagadda |
| 2006/0282540 A1 | 12/2006 | Tanimoto |
| 2007/0022477 A1 | 1/2007 | Larson |
| 2007/0233844 A1 | 10/2007 | Tanimoto |
| 2008/0089349 A1 | 4/2008 | Tanimoto |
| 2008/0098088 A1 | 4/2008 | Tamano et al. |
| 2008/0288591 A1 | 11/2008 | Tanimoto |

FOREIGN PATENT DOCUMENTS

| | | |
|---|---|---|
| EP | 1 427 166 A2 | 6/2004 |
| GB | 2 350 269 A | 11/2000 |
| JP | 56-025880 B2 | 3/1981 |
| JP | 61-225957 A | 10/1986 |
| JP | 04-105143 A | 4/1992 |
| JP | 07-162448 A | 6/1995 |
| JP | 07-319784 A | 12/1995 |
| JP | 09-288608 A | 11/1997 |
| JP | 10-177548 A | 6/1998 |
| JP | 11-234270 A | 8/1999 |
| JP | 11-272534 A | 10/1999 |
| JP | 11-313059 A | 11/1999 |
| JP | 2000-083067 A | 3/2000 |
| JP | 2000-115167 A | 4/2000 |
| JP | 2001-014254 A | 1/2001 |
| JP | 2001-184289 A | 7/2001 |
| JP | 2001-292167 A | 10/2001 |
| JP | 2002-007182 A | 1/2002 |
| JP | 2002-199150 A | 7/2002 |
| JP | 2002-217943 A | 8/2002 |
| JP | 2002-269059 A | 9/2002 |
| JP | 2002-288415 A | 10/2002 |
| JP | 2002-314573 A | 10/2002 |
| JP | 2002-342144 A | 11/2002 |
| JP | 2003-032310 A | 1/2003 |
| JP | 2004-013479 A | 1/2004 |
| JP | 2004-201255 A | 7/2004 |
| JP | 2004-310371 A | 11/2004 |
| JP | 2005-027040 A | 1/2005 |
| JP | 2005-115943 A | 4/2005 |
| JP | 2006-033105 A | 2/2006 |
| JP | 2006-268138 A | 10/2006 |
| JP | 2006-343943 A | 12/2006 |
| JP | 2007-265135 A | 10/2007 |
| JP | 2007-267136 A | 10/2007 |
| JP | 2008-098699 A | 4/2008 |
| JP | 2008-098888 A | 4/2008 |
| JP | 2008-148125 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |

OTHER PUBLICATIONS

Official communication issued in counterpart Japanese Application No. 2006-316815, mailed on Aug. 25, 2008.

Tanimoto; "Relay Server, Communication System and Facsimile System"; U.S. Appl. No. 10/045,698, filed Jan. 10, 2002.

Tanimoto; "Relay Server, Communication System and Facsimile System"; U.S. Appl. No. 10/045,897, filed Jan. 10, 2002.

Tanimoto; "Relay Server for Relaying Communications Between Network Devices"; U.S. Appl. No. 10/114,720, filed Apr. 1, 2002.

Tanimoto; "Relay Server"; U.S. Appl. No. 10/114,963, filed Apr. 2, 2002.

Tanimoto; "Relay Server, Network Device, Communication System, and Communication Method"; U.S. Appl. No. 10/116,615, filed Apr. 2, 2002.

Masuda et al.; "Multicast Network Control for Streaming Data Broadcasting"; IEICE Technical Report, vol. 100, No. 672; pp. 327-334; Mar. 9, 2001.

"An Old-Timer of Character Chat IRC"; Mac Fan Internet; vol. 4, No. 6; p. 33; Jun. 1999.

Shinji Okumura et al., SIP (session initiation protocol), Nikkei Communications, Sep. 22, 2003, pp. 150-158 (partial translation pp. 155-156 (Usable in IM and Presence Notification)).

Tanimoto, "Relay Server and Relay Communication System," U.S. Appl. No. 12/270,883, filed Nov. 14, 2008.

Tanimoto: "Relay Server and Relay Communication System," U.S. Appl. No. 12/335,642, filed Dec. 16, 2008.

Tanimoto: "Relay Server and Relay Communication System," U.S. Appl. No. 12/335,661, filed Dec. 16, 2008.

Tanimoto: "Relay Server and Relay Communication System," U.S. Appl. No. 12/340,868, filed Dec. 22, 2008.

Official communication issued in counterpart European Application No. 07022698.0, mailed on Jun. 6, 2008.

Traversat et al.: "Project JXTA 2.0 Super-Peer Virtual Network," Sun Microsystems; XP-002481407; May 25, 2003; pp. 1-20.

Tanimoto: "Relay-Server," U.S. Appl. No. 11/853,943, filed Sep. 12, 2007.

Tanimoto: "File Server Device," U.S. Appl. No. 11/862,654, filed Sep. 27, 2007.

Tanimoto: "File Transfer Server," U.S. Appl. No. 11/870,622, filed Oct. 11, 2007.

Tanimoto: "Relay Server and Client Terminal," U.S. Appl. No. 11/953,351, filed Dec. 10, 2007.

Tanimoto: "Relay Server and Relay Communication System," U.S. Appl. No. 12/107,793, filed Apr. 23, 2008.

Tanimoto: "Relay Server and Relay Communication System," U.S. Appl. No. 11/953,505, filed Dec. 10, 2007.

Tanimoto: "Relay Server and Relay Communication System," U.S. Appl. No. 12/103,933, filed Apr. 16, 2008.

Tanimoto: "Relay Server and Relay Communication System," U.S. Appl. No. 12/112,127, filed Apr. 30, 2008.

Official Communication issued in U.S. Appl. No. 11/723,466, mailed on Nov. 8, 2010.

Tanimoto; "Relay Device and Communication System"; U.S. Appl. No. 11/723,466; filed Mar. 20, 2007.

English translation of Official Communication issued in corresponding Japanese Patent Application No. 2006-334652, mailed on Jun. 8, 2010.

English translation of Official Communication issued in corresponding Japanese Patent Application No. 2007-152122, mailed on Jun. 2, 2010.

Tanimoto, "Relay Server and Relay Communication System", U.S. Appl. No. 13/061,234, filed Feb. 28, 2011.

Tanimoto, "Relay Server, Relay Communication System, and Communication Apparatus", U.S. Appl. No. 13/061,725, filed Mar. 2, 2011.

Official Communication issued in International Patent Application No. PCT/JP2010/001594, mailed on Mar. 30, 2010.

Official Communication issued in International Patent Application No. PCT/JP2010/003240, mailed on Jun. 15, 2010.

Official Communication issued in International Patent Application No. PCT/JP2010/005041, mailed on Nov. 22, 2010.

Official Communication issued in International Patent Application No. PCT/JP2010/005679, mailed on Oct. 26, 2010.

Official Communication issued in International Patent Application No. PCT/JP2010/005680, mailed on Oct. 26, 2010.

Hitoshi, "Network World", vol. 9, No. 12, Dec. 1, 2004, pp. 148-150.

Official Communication issued in corresponding Japanese Patent Application No. 2007-339311, mailed on Apr. 8, 2011.

"Error & Warning Message Ways of Coping, Nikkei Personal Computer", Nikkei Business Publications, Inc., May 10, 2007.

Official Communication issued in corresponding European Patent Application No. 08007866.0, mailed on Apr. 19, 2011.

\* cited by examiner

FIG. 9

RELAY GROUP INFORMATION CREATED IN (2), (3)

```
<?xml version="1.0" encoding="Shift_JIS" ?>
<relay-policy policy-id="20061001150032@relay-server1" >
  <policy-info>

<relay-account account="relay-server1@net" name="BRANCH A" >
    <user-account account="user1A@account" name="terminal1A" group="0001" />
    <user-account account="user1B@account" name="terminal1B" group="0001" />
  </relay-account>

<relay-account account="relay-server2@net" name="BRANCH B" >
    <user-account account="user2A@account" name="terminal2A" group="0002" />
    <user-account account="user2B@account" name="terminal2B" group="0002" />
  </relay-account>

<relay-account account="relay-server3@net" name="支社 C" >
    <user-account account="user3A@account" name="terminal3A" group="0003" />
    <user-account account="user3B@account" name="terminal3B" group="0003" />
  </relay-account>

</policy-info>
</relay-policy>
```

SHARED RESOURCE INFORMATION UPDATED IN (5)

```xml
<?xml version= "1.0" encoding= "Shift_JIS" ?>
<user-account account= "user1A@account" >
    <policy name= "user1A-policy01" policy-id= "20061001150032user1A@relay-server1" >
        <family-account-info>
            <user-account account= "user1A@account" />
            <user-account account= "user2A@account" />
            <user-account account= "user3A@account" />
        </family-account-info>
        <family-resource-info>
            <resource name= "folderA" owner= "user1A@account" value= "c:/folderA" >
                <file name= "file001.xls" owner= "user1A@account" value= "c:/folderA/file001.xls" />
                <file name= "file002.wrd" owner= "user1A@account" value= "c:/folderA/file002.wrd" />
            </resource>
            <resource name= "file003.pdf" owner= "user1A@account" value= "c:/folderB/file003.pdf" />
        </family-resource-info>
    </policy>
</user-account>
```

FIG. 13

SHARED RESOURCE INFORMATION CREATED TO user1A IN (6)

```xml
<?xml version="1.0" encoding="Shift_JIS" ?>
<user-account account="user1A@account" >
    <policy name="user1A-policy01" policy-id="20061001150032user1A@relay-server1" >
        <family-account-info>
            <user-account account="user1A@account" />
            <user-account account="user2A@account" />
            <user-account account="user3A@account" />
        </family-account-info>
        <family-resource-info>
            <resource name="folderA" owner="user1A@account" value="c:/folderA" >
                <resource name="file001.xls" owner="user1A@account" value="c:/folderA/file001.xls" />
                <resource name="file002.wrd" owner="user1A@account" value="c:/folderA/file002.wrd" />
            </resource>
            <resource name="file003.pdf" owner="user1A@account" value="c:/folderB/file003.pdf" />
        </family-resource-info>
    </policy>
    <policy name="user2B-policy02" policy-id="20061001152532user2B@relay-server2" >
        <family-account-info>
            <user-account account="user1A@account" />
            <user-account account="user2B@account" />
            <user-account account="user3B@account" />
        </family-account-info>
        <family-resource-info>
        </family-resource-info>
    </policy>
</user-account>
```

SHARED RESOURCE INFORMATION UPDATED TO user1A IN (7)                                    120d

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" value="c:/folderA" >
        <resource name="file001.xls" owner="user1A@account" value="c:/folderA/file001.xls" />
        <resource name="file002.wrd" owner="user1A@account" value="c:/folderA/file002.wrd" />
        <resource name="file003.pdf" owner="user1A@account" value="c:/folderA/file003.pdf" />
      </resource>
    </family-resource-info>
  </policy>
  <policy name="user2B-policy02" policy-id="20061001152532user2B@relay-server2" >
    <family-account-info>
      <user-account account="user1A@account" />
      <user-account account="user2B@account" />
      <user-account account="user3B@account" />
    </family-account-info>
    <family-resource-info>
      <resource name="file005.ppt" owner="user1A@account" value="c:/file005.ppt" />
    </family-resource-info>
  </policy>
</user-account>
```

122a encompasses the second policy block.
123a: "c:/folderB/file003.pdf"
125b: resource name="file005.ppt"

FIG. 16

SHARED RESOURCE INFORMATION UPDATED TO user1A IN (8)

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" >
        <resource name="file001.xls" owner="user1A@account" value="c:/folderA/file001.xls" />
        <resource name="file002.wrd" owner="user1A@account" value="c:/folderA/file002.wrd" />
      </resource>
      <resource name="file003.pdf" owner="user1A@account" value="c:/folderB/file003.pdf" />
    </family-resource-info>
  </policy>
  <policy name="user2B-policy02" policy-id="20061001152532user2B@relay-server2" >
    <family-account-info>
      <user-account account="user1A@account" />
      <user-account account="user2B@account" />
      <user-account account="user3B@account" />
    </family-account-info>
    <family-resource-info>
      <resource name="file005.ppt" owner="user1A@account" value="c:/file005.ppt" />
      <resource name="folderC" owner="user2B@account" value="c:/folderC" >
        <resource name="file00A.ppt" owner="user2B@account" value="c:/folderC/file00A.ppt" />
        <resource name="file00B.ppt" owner="user2B@account" value="c:/folderC/file00B.ppt" />
      </resource>
    </family-resource-info>
  </policy>
</user-account>
```

FIG. 18

SHARED RESOURCE INFORMATION UPDATED DUE TO DELETION OF FILE IN (9)            /120f

```
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" >
        <resource name="file001.xls" owner="user1A@account" value="c:/folderA" />
        <resource name="file002.wrd" owner="user1A@account" value="c:/folderA/file001.xls" />
      </resource>                                                      value="c:/folderA/file002.wrd" />
      <resource name="file003.pdf" owner="user1A@account" value="c:/folderB/file003.pdf" />
    </family-resource-info>
  </policy>
  <policy name="user2B-policy02" policy-id="20061001152532user2B@relay-server2" >
    <family-account-info>
      <user-account account="user1A@account" />
      <user-account account="user2B@account" />
      <user-account account="user3B@account" />
    </family-account-info>
    <family-resource-info>
      <resource name="file005.ppt" owner="user1A@account" value="c:/file005.ppt" />
      <resource name="folderC" owner="user2B@account" value="c:/folderC" >
        <resource name="file00B.ppt" owner="user2B@account" value="c:/folderC/file00B.ppt" />
      </resource>
    </family-resource-info>
  </policy>
</user-account>
```

RELAY GROUP INFORMATION

```
<?xml version="1.0" encoding="Shift_JIS" ?>
<relay-policy policy-id="20061001150032@relay-server1" >
<policy-info>

<relay-account account="relay-server1@net" name="BRANCH A" >
  <user-account account="user1A@account" name="user1A" group="0001" />
  <user-account account="user1B@account" name="user1B" group="0001" />
</relay-account>

<relay-account account="relay-server2@net" name="BRANCH B" >
  <user-account account="user2A@account" name="user2A" group="0002" />
  <user-account account="user2B@account" name="user2B" group="0002" />
</relay-account>

<relay-account account="relay-server3@net" name="BRANCH C" >
  <user-account account="user3A@account" name="user3A" group="0003" />
  <user-account account="user3B@account" name="user3B" group="0003" />
</relay-account>

</policy-info>
</relay-policy>
```

FIG. 21

SHARED RESOURCE INFORMATION

```xml
<?xml version="1.0" encoding="Shift_JIS" ?>
<user-account account="user1A@account" >
  <policy name="user1A-policy01" policy-id="20061001150032user1A@relay-server1" >
    <family-account-info>
      <user-account account="user1A@account" />
      <user-account account="user2A@account" />
      <user-account account="user3A@account" />
    </family-account-info>
    <family-resource-info>
      <resource name="folderA" owner="user1A@account" value="c:/folderA" >
        <resource name="file001.xls" owner="user1A@account" value="c:/folderA/file001.xls" />
        <resource name="file002.wrd" owner="user1A@account" value="c:/folderA/file002.wrd" />
      </resource>
      <resource name="file003.pdf" owner="user3A@account" value="c:/folderB/file003.pdf" />
    </family-resource-info>
  </policy>
  <policy name="user2B-policy02" policy-id="20061001152532user2B@relay-server2" >
    <family-account-info>
      <user-account account="user1A@account" />
      <user-account account="user2B@account" />
      <user-account account="user3B@account" />
    </family-account-info>
    <family-resource-info>
      <resource name="folderC" owner="user2B@account" value="c:/folderC" >
        <resource name="file00A.ppt" owner="user2B@account" value="c:/folderC/file00A.ppt" />
        <resource name="file00B.ppt" owner="user2B@account" value="c:/folderC/file00B.ppt" />
      </resource>
    </family-resource-info>
  </policy>
</user-account>
```

FIG. 30

LOG INFORMATION STORED IN Relay-Server2

| OPERATION | RESOURCE | REQUEST | TARGET | METHOD | REL TIME | DATE |
|---|---|---|---|---|---|---|
| CopyFile | "file001.xls" | user2A | user2A | CopyFile(S71) | 00:00:00:000 | 2006/10/01 08:45:36 |
| | | | Relay-server1 | INVITE-OK-File Transfer (S71.1, S71.2) | 00:00:00:012 | |
| | | | user2A | File Transfer | 00:00:02:500 | |
| | | | Relay-server1 | BYE-OK(S72) | 00:00:35:012 | |
| Logoff | — | user2A | user2A | REGISTER-OK(S73) | 00:00:00:000 | 2006/10/01 09:00:36 |
| Logon | — | user2A | user2A | REGISTER-OK(S78) | 00:00:00:000 | 2006/10/03 08:01:06 |
| GetLog | — | user2A | user2A | GetLog(S79) | 00:00:00:000 | 2006/10/03 08:14:08 |
| | | | Relay-server1 | SUBSCRIBE-NOTIFY(S79.1) | 00:00:00:012 | |
| | | | Relay-server3 | SUBSCRIBE-NOTIFY(S79.2) | 00:00:01:013 | |
| | | | user2A | OutputLog | 00:00:23:023 | |
| GetLog | "file003.pdf" | user2A | user2A | GetLog(S81) | 00:00:00:000 | 2006/10/03 10:30:00 |
| | | | Relay-server1 | SUBSCRIBE-NOTIFY(S81.1) | 00:00:00:012 | |
| | | | Relay-server3 | SUBSCRIBE-NOTIFY(S81.2) | 00:00:01:013 | |
| | | | user2A | OutputLog | 00:00:23:023 | |

FIG. 31

LOG INFORMATION STORED IN Relay-Server1

| OPERATION | RESOURCE | REQUEST | TARGET | METHOD | REL TIME | DATE |
|---|---|---|---|---|---|---|
| CopyFile | "file001.xls" | relay-server2::user2A | Relay-server2 | INVITE(S71.1) | 00:00:00:000 | 2006/10/01 08:45:36 |
| | | | user1A | CopyFile-OK(S71.1.1) | 00:00:00:012 | |
| | | | Relay-server2 | OK | 00:00:00:013 | |
| | | | user1A | GetFileData-File Transfer (S71.2.1) | 00:00:02:125 | |
| | | | Relay-server2 | File Transfer (S71.2) | 00:00:02:130 | |
| | | | Relay-server2 | BYE-OK(S72) | 00:00:35:000 | |
| Logon | - | user2A | user2A | REGISTER-OK(S74) | 00:00:00:000 | 2006/10/02 08:00:00 |
| | | | user2A | OpenFile(S75) | 00:00:00:000 | |
| OpenFile | "file003.pdf" | user2A | Relay-server3 | INVITE-OK-File Transfer (S75.1, S75.2) | 00:00:00:012 | 2006/10/02 09:15:36 |
| | | | user1A | File Transfer | 00:00:03:015 | |
| | | | Relay-server3 | BYE-OK(S76) | 00:00:30:043 | |
| Logoff | - | user2A | Relay-server2 | REGISTER-OK(S77) | 00:00:00:000 | 2006/10/02 10:00:09 |
| GetLog | - | relay-server2::user2A | Relay-server2 | SUBSCRIBE-NOTIFY(S79.1) | 00:00:00:000 | 2006/10/03 08:14:08 |
| OpenFile | "file003.pdf" | user1A | user1A | OpenFile(S80) | 00:00:00:000 | 2006/10/03 10:10:00 |
| | | | Relay-server3 | INVITE-OK-File Transfer (S80.1, S80.2) | 00:00:00:012 | |
| | | | user1A | File Transfer | 00:00:03:015 | |
| | | | Relay-server3 | BYE-OK(-) | 00:00:30:043 | |
| GetLog | "file003.pdf" | relay-server2::user2A | Relay-server2 | SUBSCRIBE-NOTIFY(S81.1) | 00:00:00:000 | 2006/10/03 10:30:00 |

FIG. 32

LOG INFORMATION STORED IN Relay-Server3

| OPERATION | RESOURCE | REQUEST | TARGET | METHOD | REL TIME | DATE |
|---|---|---|---|---|---|---|
| OpenFile | "file003.pdf" | relay-server1::user2A | Relay-server1 | INVITE (S75.1) | 00:00:00:000 | 2006/10/02 09:15:36 |
| | | | user3A | OpenFile-OK (S75.1.1) | 00:00:00:002 | |
| | | | Relay-server1 | OK | 00:00:00:012 | |
| | | | user3A | GetFileData-File Transfer (S75.2.1) | 00:00:02:125 | |
| | | | Relay-server1 | File Transfer (S75.2) | 00:00:02:130 | |
| | | | Relay-server1 | BYE-OK (S76) | 00:00:30:043 | |
| GetLog | - | relay-server2::user2A | Relay-server2 | SUBSCRIBE-NOTIFY (S79.2) | 00:00:00:000 | 2006/10/03 08:14:08 |
| OpenFile | "file003.pdf" | relay-server1::user1A | Relay-server1 | INVITE (S80.1) | 00:00:00:000 | 2006/10/03 10:10:00 |
| | | | user3A | OpenFile-OK (S80.1.1) | 00:00:00:002 | |
| | | | Relay-server1 | OK | 00:00:00:012 | |
| | | | user3A | GetFileData-File Transfer (S80.2.1) | 00:00:02:125 | |
| | | | Relay-server1 | File Transfer (S80.2) | 00:00:02:130 | |
| | | | Relay-server1 | BYE-OK (-) | 00:00:30:043 | |
| GetLog | "file003.pdf" | relay-server2::user2A | Relay-server2 | SUBSCRIBE-NOTIFY (S81.2) | 00:00:00:000 | 2006/10/03 10:30:00 |

FIG. 33

LOG INFORMATION OUTPUT WITH "user2A" DESIGNATED

| OPERATION | RESOURCE | TARGET | METHOD | REL TIME | DATE |
|---|---|---|---|---|---|
| CopyFile | "file001.xls" | Relay-server2 | CopyFile(S71) | 00:00:00:000 | |
| | | Relay-server2-Relay-server1 | INVITE(S71.1) | 00:00:00:012 | |
| | | Relay-server1-user1A | CopyFile-OK(S71.1.1) | 00:00:00:012 | |
| | | Relay-server1-Relay-server2 | OK | 00:00:00:013 | |
| | | Relay-server1-user1A | GetFileData-File Transfer(S71.2.1) | 00:00:02:125 | 2006/10/01 08:45:36 |
| | | Relay-server1-Relay-server2 | File Transfer(S71.2) | 00:00:02:130 | |
| | | Relay-server2 | File Transfer | 00:00:02:500 | |
| | | Relay-server2-Relay-server1 | BYE-OK(S72) | 00:00:35:012 | |
| Logoff | — | Relay-server2 | REGISTER-OK(S73) | 00:00:00:000 | 2006/10/01 09:00:36 |
| Logon | — | Relay-server1 | REGISTER-OK(S74) | 00:00:00:000 | 2006/10/02 08:00:00 |
| OpenFile | "file003.pdf" | Relay-server1 | OpenFile(S75) | 00:00:00:000 | |
| | | Relay-server1-Relay-server3 | INVITE(S75.1) | 00:00:00:012 | |
| | | Relay-server3-user3A | OpenFile-OK(S75.1.1) | 00:00:00:014 | |
| | | Relay-server3-Relay-server1 | OK | 00:00:00:028 | |
| | | Relay-server3-user3A | GetFileData-File Transfer(S75.2.1) | 00:00:02:125 | 2006/10/02 09:15:36 |
| | | Relay-server3-Relay-server1 | File Transfer(S75.2) | 00:00:02:130 | |
| | | Relay-server1 | File Transfer | 00:00:03:015 | |
| | | Relay-server1-Relay-server3 | BYE-OK(S76) | 00:00:30:043 | |
| Logoff | — | Relay-server1 | REGISTER-OK(S77) | 00:00:00:000 | 2006/10/02 10:00:09 |
| Logon | — | Relay-server2 | REGISTER-OK(S78) | 00:00:00:000 | 2006/10/03 08:01:06 |
| GetLog | — | Relay-server2 | GetLog(S79) | 00:00:00:000 | |
| | | Relay-server2-Relay-server1 | SUBSCRIBE-NOTIFY(S79.1) | 00:00:00:012 | |
| | | Relay-server2-Relay-server3 | SUBSCRIBE-NOTIFY(S79.2) | 00:00:01:013 | |
| | | Relay-server2 | OutputLog | 00:00:23:023 | 2006/10/03 08:14:08 |

FIG. 34

LOG INFORMATION OUTPUT WITH "file003.pdf" DESIGNATED

| OPERATION | REQUEST | TARGET | METHOD | REL TIME | DATE |
|---|---|---|---|---|---|
| OpenFile | user2A | user2A-Relay-server1 | OpenFile(S75) | 00:00:00:000 | 2006/10/02 09:15:36 |
| | | Relay-server1-Relay-server3 | INVITE(S75.1) | 00:00:00:012 | |
| | | Relay-server3-user3A | OpenFile-OK(S75.1.1) | 00:00:00:014 | |
| | | Relay-server3-Relay-server1 | OK | 00:00:00:028 | |
| | | Relay-server3-user3A | GetFileData-File Transfer (S75.2.1) | 00:00:02:125 | |
| | | Relay-server3-Relay-server1 | File Transfer(S75.2) | 00:00:02:130 | |
| | | Relay-server1-user2A | File Transfer | 00:00:03:015 | |
| | | Relay-server1-Relay-server3 | BYE-OK(S76) | 00:00:30:043 | |
| OpenFile | user1A | user1A-Relay-server1 | OpenFile(S80) | 00:00:00:000 | 2006/10/03 10:10:00 |
| | | Relay-server1-Relay-server3 | INVITE(S80.1) | 00:00:00:012 | |
| | | Relay-server3-user3A | OpenFile-OK(S80.1.1) | 00:00:00:014 | |
| | | Relay-server3-Relay-server1 | OK | 00:00:00:026 | |
| | | Relay-server3-user3A | GetFileData-File Transfer (S80.2.1) | 00:00:02:125 | |
| | | Relay-server3-Relay-server1 | File Transfer(S80.2) | 00:00:02:130 | |
| | | Relay-server1-user1A | File Transfer | 00:00:03:015 | |
| | | Relay-server1-Relay-server3 | BYE-OK(-) | 00:00:30:043 | |
| GetLog | user2A | user2A-Relay-server2 | GetLog(S81) | 00:00:00:000 | 2006/10/03 10:30:00 |
| | | Relay-server2-Relay-server1 | SUBSCRIBE-NOTIFY(S81.1) | 00:00:00:012 | |
| | | Relay-server2-Relay-server3 | SUBSCRIBE-NOTIFY(S81.2) | 00:00:01:013 | |
| | | Relay-server2-user2A | OutputLog | 00:00:23:023 | |

RELAY SERVER, RELAY COMMUNICATION SYSTEM, AND COMMUNICATION DEVICE

CROSS-REFERENCE TO RELATED APPLICATIONS

This application claims priority under 35 U.S.C. 119 to Japanese Patent Application No. 2006-316815, filed on Nov. 24, 2006, No. 2006-327158, filed on Dec. 4, 2006, and No. 2006-335512, filed on Dec. 13, 2006, which applications are hereby incorporated by reference in their entirety.

BACKGROUND OF THE INVENTION

1. Field of the Invention

The present invention relates to a relay server and a relay communication system which can enable communications with terminals in a different local area network (LAN) over a wide area network (WAN), and more particularly, to a technology of allowing a terminal in a LAN to operate resources retained by a terminal in a different LAN.

2. Description of the Related Art

A communication technology called a virtual private network (VPN) is known. By using this communication technology, it is possible to use a remote LAN like a directly connected network. For example, terminals connected to LANs of plural branches provided in local areas, respectively, can communicate with each other over the Internet.

Various systems for such a type of technology have been suggested (for example, see JP-A-2002-217938).

BRIEF SUMMARY OF THE INVENTION

However, such a type of system tends to be stiff because a network is virtually constructed. Accordingly, it is not easy to construct an expansible and flexible system and the suggested systems have both merits and demerits in function, cost, and the like.

For example, in a LAN, since resources are managed under the same protocol and the system configuration is not much complicated, plural terminals can share the resources simply. However, when a communication system extends between plural LANs over a WAN, it is not possible to easily cope with such intention that plural terminals share resources such as folders or files or a file retained by a terminal is deleted by a different terminal. This is also true in a case where different protocols are used in the LANs.

The resources retained by the terminals vary endlessly due to deletion or movement, but it is not easy to dynamically cope with such a variation.

Software for accessing a certain system should be introduced into terminals disposed in the system, but appropriate software is not available. Accordingly, it is not easy to share a resource with a necessary opposite as needed.

Such a type of system has an advantage of virtually constructing a network by means of packet transmission through plural LANs. However, packets pass through the VPN devices and the like. Accordingly, it is not easy to grasp information on deletion or movement as a whole of a virtual network, when the deletion or movement of resources is carried out between the plural LANs.

The invention is contrived to solve the above-mentioned problem. An object of the invention is to provide a relay communication system which can be easily operated and which can allow a terminal to share and operate a resource with a necessary opposite terminal even when the terminals are connected to different LANs and managed under different protocols, and a relay server used for the system. Another object of the invention is to provide a dynamic relay communication system which is expansible and flexible and which can cope with movement or the like of resources.

In order to accomplish the above-mentioned objects, according to a first aspect of the invention, there is provided a relay server that is connected to a LAN and that can communicate with a relay server of a different LAN, the relay server including: an account information registering unit that stores account information including information on client terminals connected to the LAN; a relay group information registering unit that stores relay group information including information on a group of relay servers permitting access to each other; and a shared resource information registering unit that stores shared resource information including information on resources and information on the client terminals sharing the resources. Here, when an operation command for a resource, which can be operated by a client terminal connected to the different terminal, is received from the client terminal stored in the account information registering unit on the basis of the shared resource information, the operation of the resource is relayed on the basis of the relay group information.

A second aspect of the invention provides the relay server according to the first aspect of the invention, wherein the shared resource information includes information indicating essences of the resources, information on owner client terminals which can operate the essences of the resources, and information on user client terminals which can indirectly operate the essences of the resources through the owner client terminals. Here, the relay server further includes: a terminal selecting unit that selects the owner client terminal of a resource on the basis of the shared resource information when receiving an operation command for the resource, which can be operated by the client terminal connected to the different LAN, from the user client terminal stored in the account information registering unit; and an operation command transmitting unit that selects a relay server connected to the same LAN as the selected owner client terminal is connected on the basis of the relay group information and that transmits the operation command for the resource to the owner client terminal through the selected relay server.

According to a third aspect of the invention, there is provided a relay communication system, including: a plurality of LANs; and a relay server and client terminals connected to each of the plurality of LANs, wherein the relay server includes: an account information registering unit that stores account information including information on the client terminals connected to one LAN; a relay group information registering unit that stores relay group information including information on a group of relay servers permitting access to each other; and a shared resource information registering unit that stores shared resource information including information on resources and information on the client terminals sharing the resources. Here, when receiving an operation command for a resource, which can be operated by a client terminal connected to the different terminal, from the client terminal stored in the account information registering unit on the basis of the shared resource information, the relay server relays the operation of the resource on the basis of the relay group information. The client terminal connected to one LAN is allowed to indirectly operate the resource held by the client terminal connected to a different LAN.

According to a fourth aspect of the invention, there is provided a communication device that can communicate with a communication device in a different LAN through an extra-LAN relay server in the different LAN from an intra-LAN relay server in a LAN, the communication device including: a shared resource information receiving unit that receives shared resource information, which includes information on resources which can be operated by the communication device in the different LAN and information on the communication devices sharing the resources, from the intra-LAN relay server; a shared resource information display unit that displays details of the shared resource information; and an operation determining unit that determines whether a resource can be directly operated in response to an operation command for the resource. Here, when the resource having been instructed to be operated cannot be directly operated, the communication device transmits the operation command to the intra-LAN relay server and indirectly operate the resource through the extra-LAN relay server.

A fifth aspect of the invention provides the communication device according to the fourth aspect of the invention, further including: a shared resource information registering unit that registers the shared resource information, which includes information on resources which can be operated by the communicate device and information on the communication devices sharing the resources, in the intra-LAN relay server; a connection checking unit that checks whether the resources stored in the intra-LAN relay server are periodically accessible; and a shared resource information notifying unit that notifies the intra-LAN relay server of a change of the shared resource information when it is checked that a resource is not accessible.

According to a sixth aspect of the invention, there is provided a relay communication system, including: a plurality of LANs connected to a WAN; and a relay server and communication devices connected to each of the plurality of LANs, wherein each communication device is a communication device that can communicate with a communication device in a different LAN through an extra-LAN relay server in the different LAN from an intra-LAN relay server in the same LAN. The communication device includes: a shared resource information receiving unit that receives shared resource information, which includes information on resources which can be operated by the communication device in the different LAN and information on the communication devices sharing the resources, from the intra-LAN relay server; a shared resource information display unit that displays details of the shared resource information; and an operation determining unit that determines whether a resource can be directly operated in response to an operation command for the resource. Here, when the resource having been instructed to be operated cannot be directly operated, the communication device transmits the operation command to the intra-LAN relay server and indirectly operate the resource through the extra-LAN relay server.

According to a seventh aspect of the invention, there is provided a relay server that is connected to a LAN and that can communicate with a relay server connected to a different LAN, the relay server including: an account information registering unit that stores account information including information on client terminals connected to the LAN; a relay group information registering unit that stores relay group information including information on a group of relay servers permitting communications with each other; and a shared resource information registering unit that stores shared resource information including information on resources and information on the client terminals sharing the resources. Here, when an operation command for a resource, which can be operated by a client terminal connected to the different terminal, is received from the client terminal stored in the account information registering unit on the basis of the shared resource information, the operation of the resource is relayed on the basis of the relay group information. The relay server further includes: a log information storing unit that stores log information including information on the operation command; and a log information exchanging unit that exchanges the log information between the group of relay servers on the basis of the relay group information.

An eight aspect of the invention provides the relay server according to the seventh aspect of the invention, further including a first log information outputting unit that outputs the log information associated with a specific client terminal among the log information which is exchanged between the group of relay servers.

A ninth aspect of the invention provides the relay server according to the seventh aspect of the invention, further including a second log information outputting unit that outputs the log information associated with a specific resource among the log information which is exchanged between the group of relay servers.

A tenth aspect of the invention provides the relay server according to the seventh aspect of the invention, further including a log information exchange setting unit that sets whether specific log information should be exchanged between the group of relay servers every relay server.

An eleventh aspect of the invention provides the relay server according to the seventh aspect of the invention, further including a log information integrating unit that integrates and outputs the log information overlapping with each other in response to the operation command passing through the plural relay servers among the log information which is exchanged between the group of relay servers.

According to a twelfth aspect of the invention, there is provided a management method using a relay server that is connected to a LAN and that can communicate with a relay server of a different LAN, the management method including: storing account information including information on client terminals connected to the LAN; storing relay group information including information on a group of relay servers permitting access to each other; and storing shared resource information including information on resources and information on the client terminals sharing the resources, wherein when an operation command for a resource, which can be operated by a client terminal connected to the different terminal, is received from the client terminal stored in the registering of the account information on the basis of the shared resource information, the operation of the resource is relayed on the basis of the relay group information.

A thirteenth aspect of the invention provides the management method according to the twelfth aspect of the invention, wherein the shared resource information includes information indicating essences of the resources, information on owner client terminals which can operate the essences of the resources, and information on user client terminals which can indirectly operate the essences of the resources through the owner client terminals, and wherein the management method further includes: selecting the owner client terminal of a resource on the basis of the shared resource information when receiving an operation command for the resource, which can be operated by the client terminal connected to the different LAN, from the user client terminal stored in the registering of the account information; and selecting a relay server connected to the same LAN as the selected owner client terminal is connected on the basis of the relay group information and transmitting the operation command for the resource to the owner client terminal through the selected relay server.

According to a fourteenth aspect of the invention, there is provided a management method of a relay communication system having a plurality of LANs and a relay server and client terminals connected to each of the plurality of LANs, the management method including: storing account information including information on the client terminals connected to one LAN; storing relay group information including information on a group of relay servers permitting access to each other; and storing shared resource information including information on resources and information on the client terminals sharing the resources, wherein when receiving an operation command for a resource, which can be operated by a client terminal connected to the different terminal, from the client terminal stored in the registering of the account information on the basis of the shared resource information, the relay server relays the operation of the resource on the basis of the relay group information, and wherein the client terminal connected to one LAN is allowed to indirectly operate the resource held by the client terminal connected to a different LAN.

According to fifteenth aspect of the invention, there is provided a management method using a communication device that can communicate with a communication device in a different LAN through an extra-LAN relay server in the different LAN from an intra-LAN relay server in a LAN, the management method including: receiving shared resource information, which includes information on resources which can be operated by the communication device in the different LAN and information on the communication devices sharing the resources, from the intra-LAN relay server; displaying details of the shared resource information; and determining whether a resource can be directly operated in response to an operation command for the resource, wherein when the resource having been instructed to be operated cannot be directly operated, the communication device transmits the operation command to the intra-LAN relay server and indirectly operates the resource through the extra-LAN relay server.

A sixteenth aspect of the invention provides the management method according to the fifteenth aspect of the invention, further including: registering the shared resource information, which includes information on resources which can be operated by the communicate device and information on the communication devices sharing the resources, in the intra-LAN relay server; checking whether the resources stored in the intra-LAN relay server are periodically accessible; and notifying the intra-LAN relay server of a change of the shared resource information when it is checked that a resource is not accessible.

According to a seventeenth aspect of the invention, there is provided a management method of a relay communication system having a plurality of LANs connected to a WAN; a relay server connected to each of the plurality of LANs; and a communication device that can communicate with a communication device in a different LAN through an extra-LAN relay server in the different LAN from an intra-LAN relay server in a LAN, the management method including: receiving shared resource information, which includes information on resources which can be operated by the communication device in the different LAN and information on the communication devices sharing the resources, from the intra-LAN relay server; displaying details of the shared resource information; and determining whether a resource can be directly operated in response to an operation command for the resource, wherein when the resource having been instructed to be operated cannot be directly operated, the communication device transmits the operation command to the intra-LAN relay server and indirectly operates the resource through the extra-LAN relay server.

According to a eighteenth aspect of the invention, there is provided a management method using a relay server that is connected to a LAN and that can communicate with a relay server connected to a different LAN, the management method including:

storing account information including information on client terminals connected to the LAN; storing relay group information including information on a group of relay servers permitting communications with each other; and storing shared resource information including information on resources and information on the client terminals sharing the resources, wherein when an operation command for a resource, which can be operated by a client terminal connected to the different terminal, is received from the client terminal stored in the registering of the account information on the basis of the shared resource information, the operation of the resource is relayed on the basis of the relay group information, and wherein the management method further includes: storing log information including information on the operation command; and exchanging the log information between the group of relay servers on the basis of the relay group information.

A nineteenth aspect of the invention provides the management method according to the eighteenth aspect of the invention, further including outputting the log information associated with a specific client terminal among the log information which is exchanged between the group of relay servers.

A twentieth aspect of the invention provides the management method according to the eighteenth aspect of the invention, further including outputting the log information associated with a specific resource among the log information which is exchanged between the group of relay servers.

A twenty-first aspect of the invention provides the management method according to the eighteenth aspect of the invention, further including setting whether specific log information should be exchanged between the group of relay servers every relay server.

A twenty-second aspect of the invention provides the management method according to the eighteenth aspect of the invention, further including integrating and outputting the log information overlapping with each other in response to the operation command passing through the plural relay servers among the log information which is exchanged between the group of relay servers.

In the relay communication system employing the relay server according to the invention, among the client terminals connected to different LANs, the respective client terminals can operate a resource held by another client terminal over the WAN as if they hold the resource. The client terminals can form a group with necessary opposites so as to share the resources as needed. Even when the resources are changed due to deletion and the like, the information on the resources is automatically updated. Accordingly, the client terminals can dynamically cope with the deletion of the resources and the like.

The relay servers connected to the LANs can store the log information on the resource operations performed between the LANs which they relay. The relay servers can exchange the log information. Accordingly, it is possible to grasp the log information on the resource operations as a whole of a network including a plurality of LANs.

Other features, elements, processes, steps, characteristics, and advantages of the invention will become more apparent from the following detailed description of preferred embodiments of the invention with reference to the attached drawings.

BRIEF DESCRIPTION OF THE DRAWINGS

FIG. 9 is a diagram illustrating details of relay group information;

FIG. 12 is a diagram illustrating details of shared resource information;

FIG. 13 is a diagram illustrating details of shared resource information;

FIG. 15 is a diagram illustrating details of shared resource information;

FIG. 16 is a diagram illustrating details of shared resource information;

FIG. 18 is a diagram illustrating details of shared resource information;

FIG. 20 is a diagram illustrating details of relay group information;

FIG. 21 is a diagram illustrating details of shared resource information;

FIG. 30 is a diagram illustrating log information stored in a relay server R2;

FIG. 31 is a diagram illustrating log information stored in a relay server R1;

FIG. 32 is a diagram illustrating log information stored in a relay server R3;

FIG. 33 is a diagram illustrating log information associated with a user 2A; and FIG. 34 is a diagram illustrating log information associated with a resource "file003.pdf".

DETAILED DESCRIPTION OF PREFERRED EMBODIMENTS

First Embodiment

Entire Configuration of Relay Communication System

Figure 1:
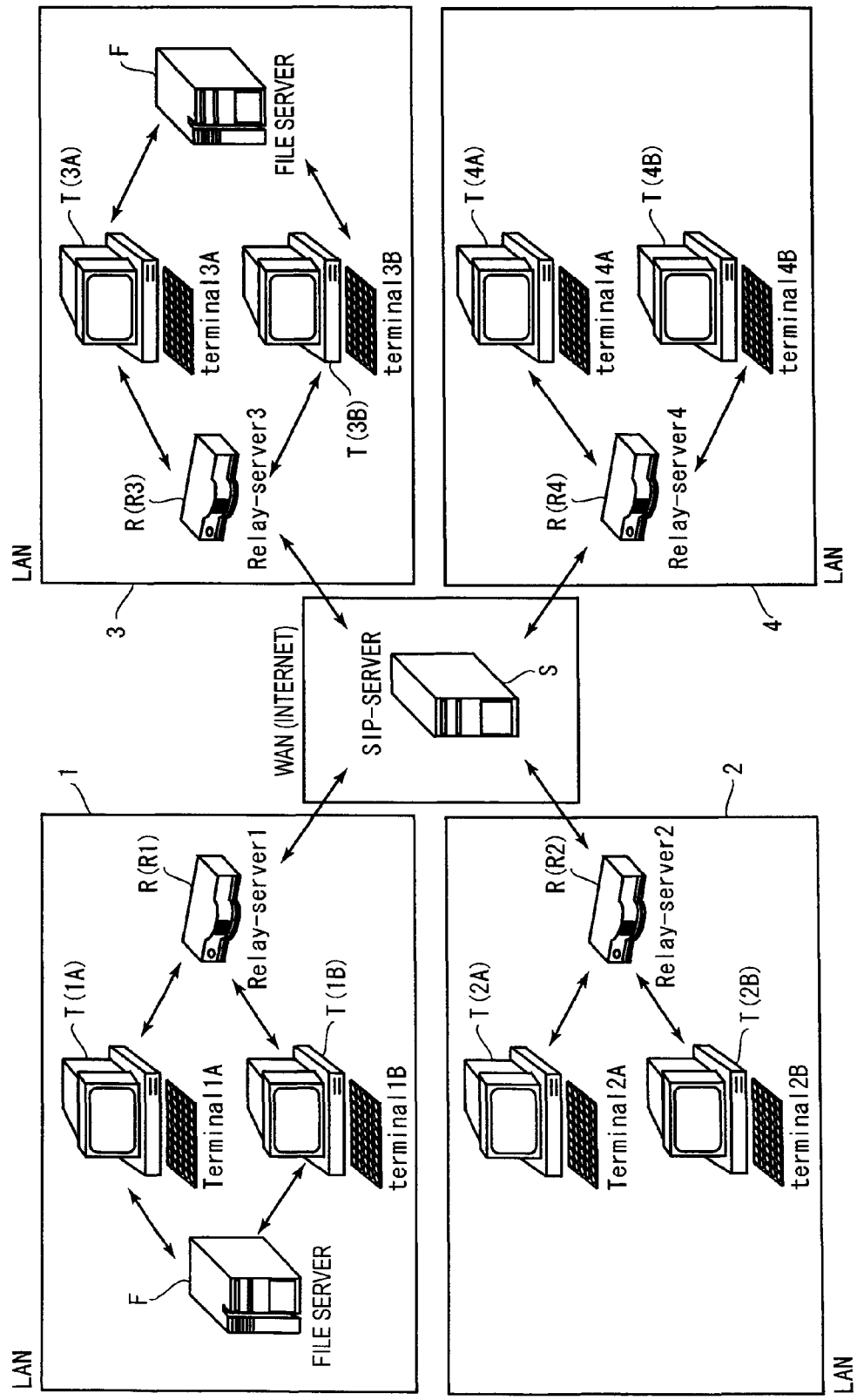
FIG. 1 is a diagram illustrating a network configuration of a relay communication system.

Hereinafter, a first embodiment of the invention will be described with reference to the drawings. FIG. 1 illustrates an entire configuration of a relay communication system according to the first embodiment. As shown in FIG. 1, the relay communication system includes plural LANs connected to a WAN. The relay communication system includes an external server S, relay servers R, client terminals T, and file servers F. Although the external server S is used in this embodiment, the relay servers R may directly communicate with each other without using the external server S.

In this embodiment, a system using a session initiation protocol (SIP) as a communication protocol between the external server S and the relay servers R in the WAN and between the relay server R and the client terminals T in the respective LANs is exemplified. However, protocols other than the SIP may be used as a communication protocol between the servers and the terminals.

The WAN (Wide Area Network) is a network for connecting different LANs. In this embodiment, the Internet is exemplified as the WAN, but the invention is not limited to the Internet, but other networks similar thereto may be used.

A LAN (Local Area Network) is a relatively small-scale network which is constructed in a defined place. Plural LANs are provided and are constructed in places physically apart from each other. For example, in this embodiment, a LAN1 is constructed in branch A in Tokyo and LAN2, LAN3, and LAN4 are constructed in branches B, C, and D of Osaka, Nagoya, and Fukuoka, respectively. Four LANs of the LAN1, LAN2, LAN3, and LAN4 are connected to the Internet which is a global network. The number of LANs is not limited to four, but may be any other plural number.

External Server

The external server S is a device used in communications between the relay servers R disposed in the LANs and is disposed over the Internet. The external server S has a function of an SIP server. Specifically, the external server S has a function of an SIP proxy server for relaying SIP methods and responses and a function of an SIP registrar server for registering accounts of the relay servers R. The number of external servers S is not limited to one, but may be a plural number to function in a distributed manner. When a protocol other than the SIP is used, communications between the relay servers R can be directly controlled on the basis of the protocol and it is thus not necessary to provide the external server S serving as the SIP server.

Figure 2:
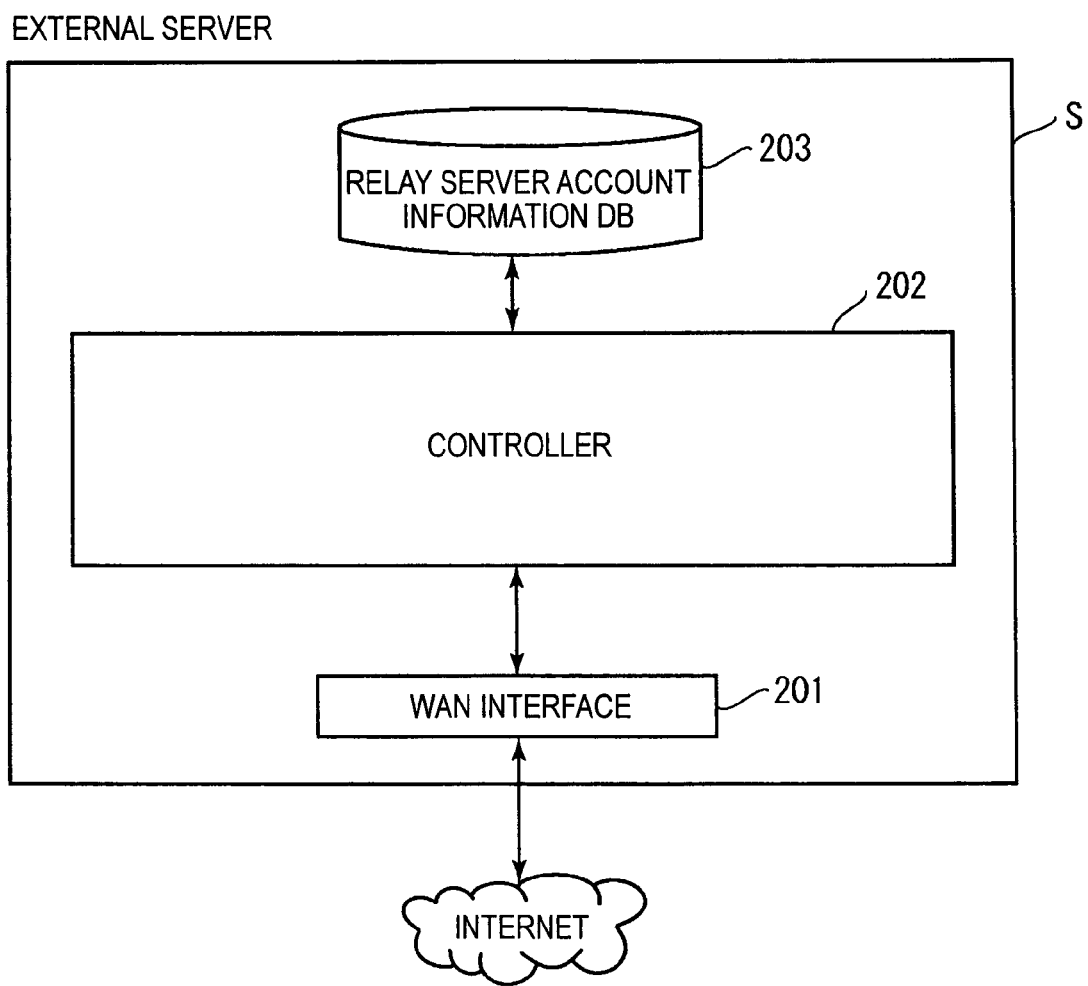
FIG. 2 is a functional block diagram illustrating an external server.

A functional block diagram of the external server S is shown in FIG. 2. As shown in FIG. 2, the external server S includes a WAN interface 201, a controller 202, and a relay server account information database (DB) 203.

The WAN interface 201 is an interface serving to communicate with devices such as the relay servers R connected to the Internet by the use of global IP addresses.

The relay server account information DB 203 is a database managing an account of the relay server R having requested for registration to be correlated with a global IP address.

The controller 202 is a processing unit serving to control various communications through the WAN interface 201 and controls a communication process in accordance with protocols such as a TCP/IP, a UDP, and an SIP. For example, the controller 202 serves to receive accounts of the relay servers R transmitted from the relay servers R and to register the received accounts in the relay server account information DB 203. The controller 203 performs a process of relaying communication data such as various SIP methods and responses transmitted from a relay server R to another relay server R. The functions of the controller and the like of the external server S will be described later.

Client Terminal

A client terminal T is a terminal which can be operated directly by a user. For example, a personal computer (PC) and the like used in a user's usual works corresponds to the client terminal T. Accordingly, plural client terminals T are generally disposed in a LAN. In this embodiment, an example is described in which client terminals 1A and 1B are connected to the LAN1, client terminals 2A and 2B are connected to the LAN2, client terminals 3A and 3B are connected to the LAN3, and client terminals 4A and 4B are connected to the LAN4. Private IP addresses which are uniquely managed only in the same LAN are given to the client terminals T.

Figure 3:
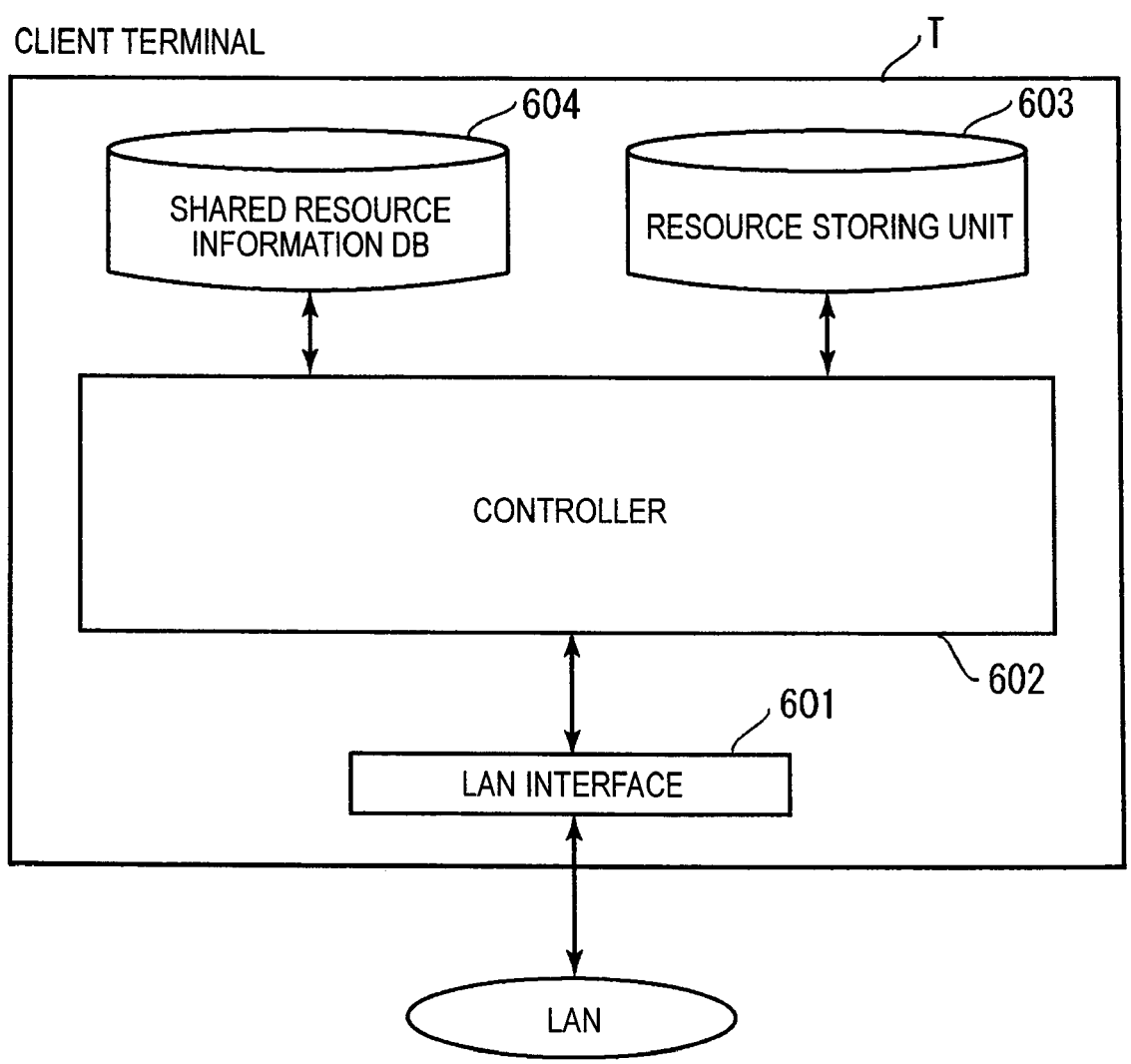
FIG. 3 is a functional block diagram illustrating a client terminal.

A functional block diagram of the client terminal T is shown in FIG. 3. As shown in FIG. 3, the client terminal T includes a LAN interface 601, a controller 602, a resource storing unit 603, and a shared resource information database (DB) 604.

The LAN interface 601 is an interface for communicating with devices such as the relay server R or the file server F connected to the same LAN.

The resource storing unit 603 stores essences of resources such as files or folders which can be operated by the client terminal T.

The shared resource information database (DB) 604 stores shared resource information 120 including information on a resource which the client terminal T shares with another client terminal T and account information of the client terminals T sharing the resource.

The controller 602 is a processing unit for controlling various communications performed through the LAN interface 601 and serves to control communication processes in accordance with the protocols such as TCP/IP, UDP, and SIP. For example, the controller 602 performs processes of controlling movement, change, and deletion of the resources stored in the resource storing unit 603. The controller 602 receives a change notification of the shared resource information 120 from the relay servers R and performs a process of updating the shared resource information 120 stored in the shared resource information DB 604. The functions of the client terminal T including the controller 602 will be described later.

Relay Server

One relay server R is disposed in each LAN. Specifically, a relay server R1 is disposed in LAN1, a relay server R2 is disposed in LAN2, a relay server R3 is disposed in LAN3, and a relay server R4 is disposed in LAN4.

The relay server R is connected to the Internet as well as a LAN. The relay server R can communicate with the client terminals T connected to the same LAN and can communicate with the relay server R connected to a different LAN through the external server S. Accordingly, global IP addresses in addition to the private IP addresses are given to the relay servers R, respectively.

Figure 4:
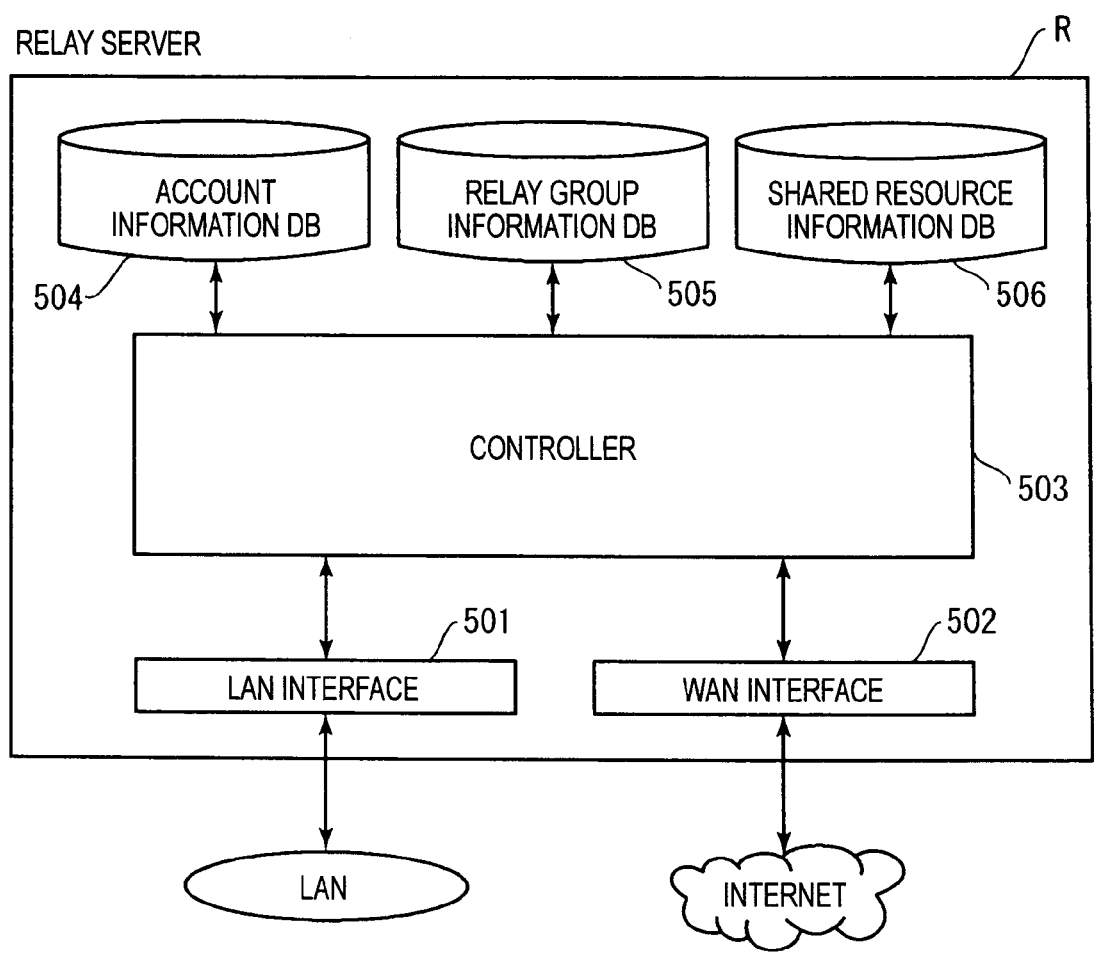
FIG. 4 is a functional block diagram illustrating a relay server.

A functional block diagram of each relay server R is shown in FIG. 4. As shown in FIG. 4, the relay server R includes a LAN interface 501, a WAN interface 502, a controller 503, an account information database (DB) 504, a relay group information database (DB) 505, and a shared resource information database (DB) 506.

The LAN interface 501 is an interface that communicates with a client terminal T connected to a LAN by the use of the private IP address. For example, in LAN1, the relay server R1 communicates with the client terminals 1A and 1B through the LAN interface 501.

The WAN interface 502 is an interface that communicates with devices such as the external server S connected to the Internet 1 by the use of the global IP address. Although it is described in this embodiment that the relay server R includes the WAN interface 502, a router may perform a connection to the Internet and the relay server R may be disposed under the control of the router.

Since the communications between the relay servers R and the client terminals T are performed using the SIP, the relay servers R have a function of an SIP registrar server. For example, the relay server R2 connected to the LAN2 serves as an SIP registrar server for registering accounts of the client terminals 2A and 2B connected to the LAN2 in the account information DB 504 using the SIP.

Figure 5:
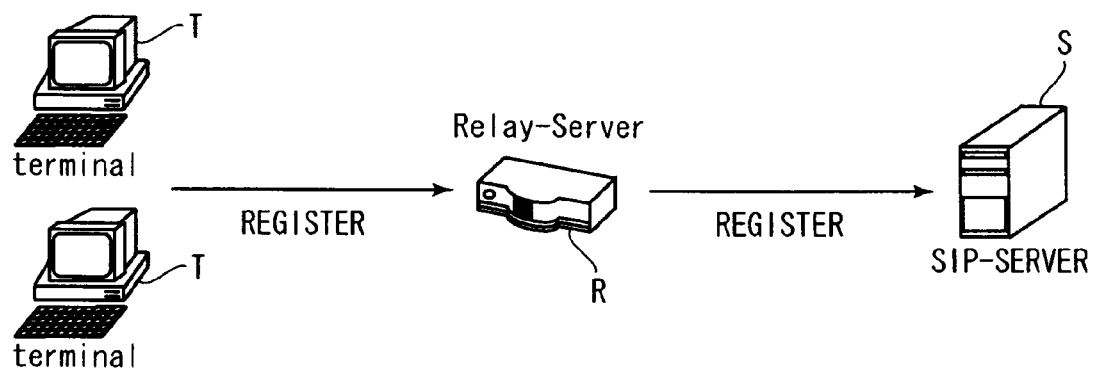
FIG. 5 is a diagram illustrating a relation between the client terminal and the relay server and a relation between the relay server and the external server.

Accordingly, as shown in FIG. 5, the relay server R serves as a server for receiving and registering the accounts from the client terminals T, in a relation with the client terminals T. In a relation with the external server S, the relay server serves as a client for transmitting and registering the accounts to the external server S.

The account information DB 504 is a database for managing the accounts of the client terminals T having requested for registration so as to be correlated with the private IP addresses.

The relay group information DB 505 is a database for managing the relay group information associated with the client terminals T registered in the account information DB 504.

The shared resource information DB 506 is a database for managing the shared resource information 120 associated with the client terminals registered in the account information DB 504.

The controller 503 is a processing unit for controlling various communications performed through the LAN interface 501 and the WAN interface 502 and serves to control various communication processes in accordance with the protocols such as the TCP/IP, the UDP, and the SIP. For example, the controller 503 performs a process of transmitting its account to the external server S and requesting for registration of the account and a processor registering the accounts transmitted from the client terminals T connected to the same LAN in the account information DB 504. The controller 503 performs a process of creating the relay group information 100 and storing the created relay group information in the relay group information DB 505 and a process of creating the shared resource information 120 and storing the created shared resource information in the shared resource information DB 506. The functions of the relay servers R including the controller 503 will be described later.

File Server

The file server F is a server that is connected to a LAN to communicate with the client terminals T connected to the same LAN and can store essences of resources such as files or folders. That is, the file server F serves as resource storing means substituted for the resource storing unit 603 of the client terminals T. That is, in this embodiment, the resources that can be operated by the client terminals T may be stored in a local disc of the corresponding terminal T or may be stored in the file server F as a network drive. Accordingly, as the file server F is shown in some LANs of the LAN1 and LAN3 in FIG. 1, the file server is not essential to the LAN but may be provided properly as needed.

Relay Group Information

Details of the relay group information 100 are shown in FIG. 9 and the like. FIG. 9 illustrates the relay group information 100 which is exchanged between three relay servers R1, R2, and R3 using the relay server R1 as a start point and which is stored in the relay group information DBs 505. The relay group information 100 includes a piece of group identification information 101 and information (relay account information) 102 on three relay servers R1, R2, and R3 permitting connections to each other.

The group identification information 101 is information for identifying the relay group information 100. A unique ID is given to each piece of relay group information every time of creation thereof and thus the relay group information is identified at a view. Accordingly, an operator or the like can specify a relay group by the use of the group identification information 101 and can easily change a group configuration.

The relay account information 102 includes information on the accounts of the relay servers R and the accounts of the client terminals T connected to the same LAN as a relay server R and registered in the relay server R. Specific names are given to the accounts of the relay servers R and the relay servers can be easily identified by a user. Similarly, specific names are given to the accounts of the client terminals T.

For example, regarding the relay account information 102a of the relay server R1 (rely-server1), a name 104 (branch A) is given to the account (relay-server1@net) of the relay server R1. Names 105 (for example, terminal 1A) are given to the accounts (for example, user1A@account) of the client terminals T connected to the same LAN. Reference numeral 103 denotes identification data indicating a post of the corresponding client terminal T, such as "sales division" and "development division."

As described above, the relay group information 100 are created to be identified from the other relay group information and includes a group of relay account information 102. The relay account information 102 includes the accounts of the relay servers R and the accounts of the client terminals T disposed in the same LAN as the relay server R is disposed and registered in the corresponding relay server R. Accordingly, referring to the relay group information 100, the LANs constituting the same group and the relay servers R or the client terminals T registered in the respective LANs can be seen.

Shared Resource Information

Details of the shared resource information 120 are shown in FIG. 12. FIG. 12 illustrates the shared resource information 120 stored in the shared resource information DB 604 of the client terminal 1A. The same information as the shared resource information 120 is also stored in the shared resource information DB 506 of the relay server R1 disposed in the same LAN as the client terminal 1A is disposed. The shared resource information 120 includes account identification information 121 indicating the shared resource information 120 associated with the client terminal 1A and individual shared resource information 122 associated with the client terminal 1A.

The account identification information 121 is information for identifying the shared resource information 120 which is created every client terminal T.

The individual shared resource information 122 includes shared resource identification information 123, family account information 124, and family resource information 125.

The shared resource identification information 123 is information for identifying the individual shared resource information 122. A different ID is given to the individual shared resource information 122 every time of creation thereof and the individual shared resource information is easily identified. The shared resource identification information 123 includes an ID (for example, 20061001150032user1A@relay-server1) correlated with the client terminal T having requested for creation of the shared resource information 120 and a name (for example, user1A-policy01) for facilitating the identification thereof.

Accordingly, since users can specify the individual shared resource information 122 by the use of the shared resource identification information 123, it is possible to easily edit the details thereof or the like.

The family resource information 125 is a set of resource information 126 indicating essences of the resources such as files or folders held by the client terminal T. The resource information 126 includes information (for example, resourcename="folderA") indicating names of essences of the shared resources, information (for example, owner="user1A@account") indicating the accounts of the client terminal T (owner client terminal) which can operate the essence of the resource, and information (for example, value="c: /folderA") indicating a position of the essence of the resource.

The family account information 124 is a set of accounts (for example, user1A@account) of the client terminals T sharing the essence of the resource indicated by the family resource information 125. The family account information 124 includes the owner client terminal T and the user client terminals T. The user client terminals T are client terminals which cannot directly operate the essence of the resource but can indirectly operate the resource through the owner client terminal T.

Account Registering Process

Figure 6:
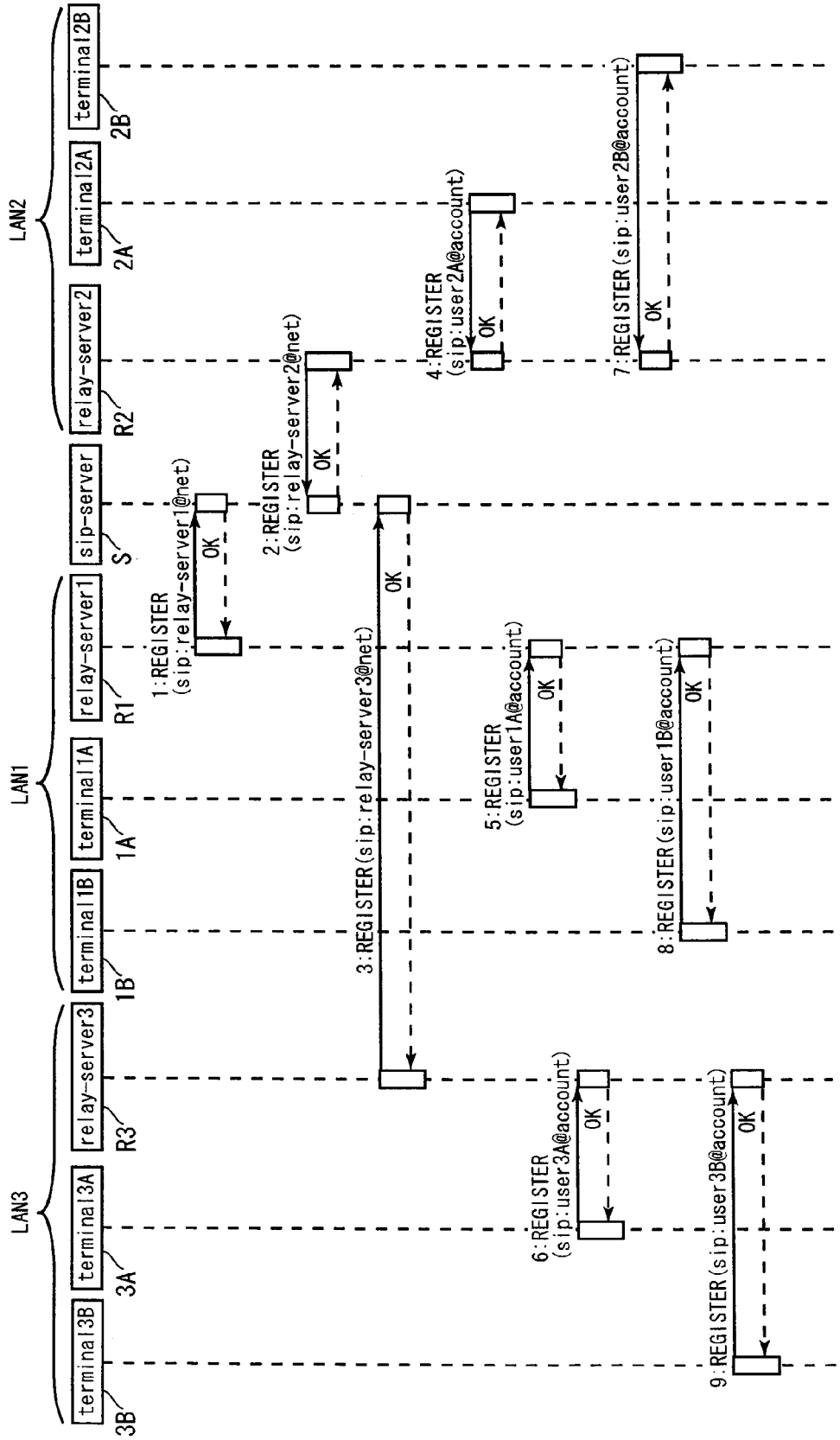
FIG. 6 is a sequence diagram illustrating a communication process.

A flow of a communication process in the relay communication system having the above-mentioned configuration will be described with reference to the process sequence diagrams shown in FIGS. 6, 7, 10, 14, and 17. Steps S1 to S9 shown in FIG. 6 show a step of registering the accounts of devices.

The relay server R1 transmits a request for registration of an account (REGISTER) to the external server S (step S1). Here, the relay server R1 gives a request for registration of its account (sip: relay-server1@net). The external server S returns an OK response to the relay server R1 and registers the account of the relay server R1 and a global IP address in the relay server account information DB 203 so as to be correlated with each other.

Subsequently, the relay server R2 transmits a request for registration of an account (REGISTER) to the external server S (step S2). Here, the relay server R2 gives a request for registration of its account (sip: relay-server2@net). The external server S returns an OK response to the relay server R2 and registers the account of the relay server R2 and a global IP address in the relay server account information DB 203 so as to be correlated with each other.

Similarly, the relay server R3 transmits a request for registration of its account (REGISTER) to the external server S and registers its account in the external server S (step S3).

The client terminal 2A transmits a request for registration of an account (REGISTER) to the relay server R2 (step S4). Here, client terminal 2A gives a request for registration of its account (sip: user2A@account). The relay server R2 returns an OK response and registers the account of the client terminal 2A and a private IP address in the account information DB 504 so as to be correlated with each other.

Subsequently, the client terminal 1A transmits a request for registration of an account (REGISTER) to the relay server R1 (step S5). Here, client terminal 1A gives a request for registration of its account (sip: user1A@account). The relay server R1 returns an OK response and registers the account of the client terminal 1A and a private IP address in the account information DB 504 so as to be correlated with each other.

Similarly, the client terminal 3A transmits a request for registration of its account to the relay server R3 (step S6) and registers the account in the relay server. The client terminal 2B transmits a request for registration of its account to the relay server R2 (step S7) and registers the account in the relay server. The client terminal 1B transmits a request for registration of its account to the relay server R1 (step S8) and registers the account in the relay server. The client terminal 3B transmits a request for registration of its account to the relay server R3 (step S9) and registers the account in the relay server.

In these steps, the registration of the accounts of the relay servers R in the external server S is ended and the registration of the accounts of the client terminals T in the relay servers R is ended.

The above-mentioned order of steps is an example and any order may be used as long as the registration of the accounts of the devices is ended. The devices cannot participate in the relay communication system, when the devices exist in the network but ends the registration of the accounts. For example, the LAN4 shown in FIG. 1 cannot participate in the communication service described here, because it has not end the registration of the accounts.

Relay Group Creating Process

Figure 7:
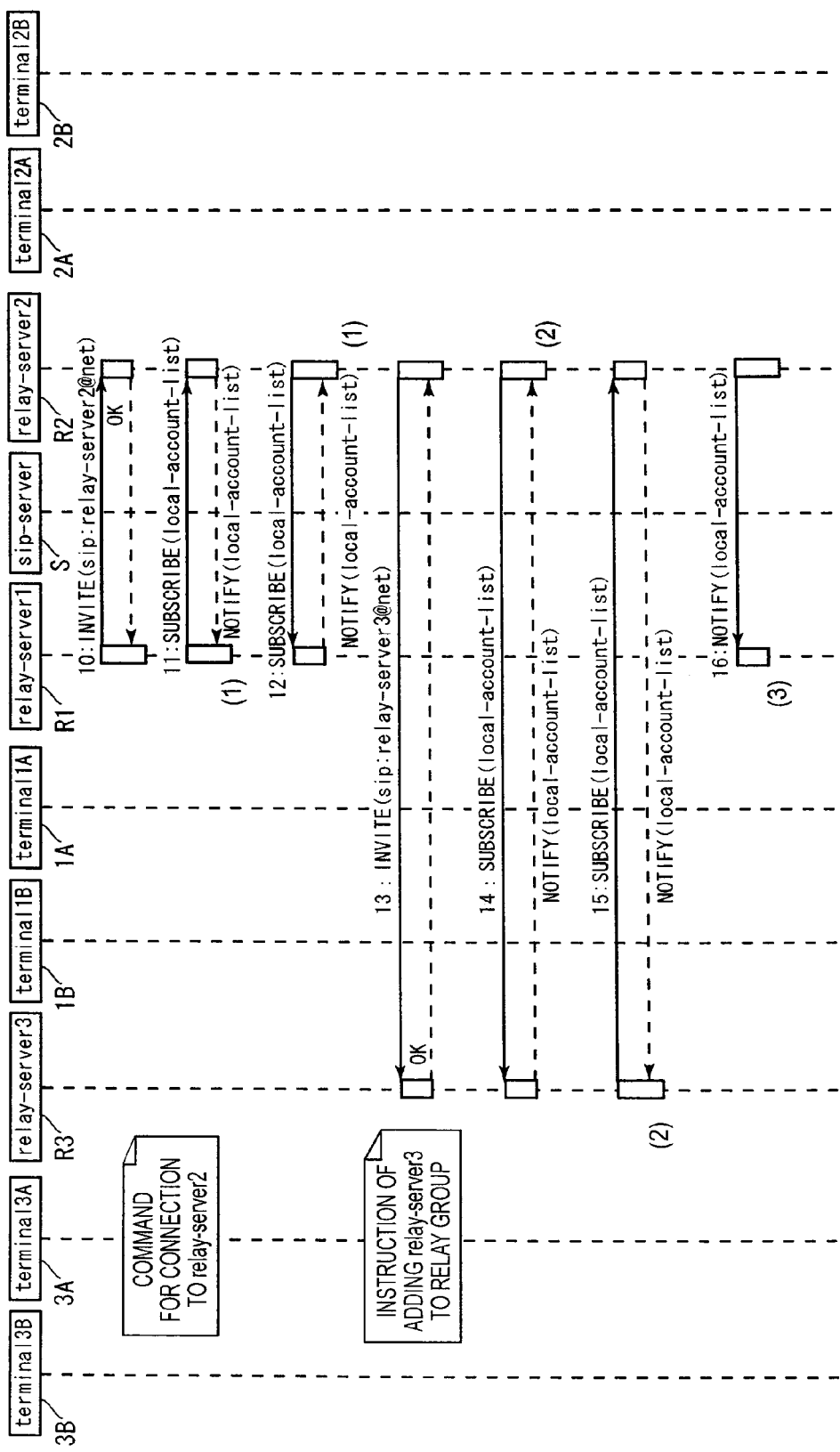
FIG. 7 is a sequence diagram illustrating a communication process.

Steps S10 to S16 show in FIG. 7 show a communication step between the relay servers R. The processes of steps S1 to S16 are generally carried out as an initial setting for a network by a user or an operator.

The relay server R1 transmits a connection request command (INVITE method) for the relay server R2 to the external server S (step S10). In the INVITE method, an account (sip: relay-server2@net) of the relay server R2 of a connection destination. The external server S acquires the global IP address of the relay server R2 by referring to the relay server account information DB 203. The external server S relays the INVITE method transmitted from the relay server R1 to the relay server R2. After the connection request command is transmitted from the relay server R1 to the relay server R2, the OK response is transmitted from the relay server R2 to the relay server R1 through the external server S.

In this way, the communication process between the relay servers R is performed via the external server S. Since the communication process between the relay servers R is performed via the external server S in any communication, the specific description of the communication process via the external server S is omitted in the following description.

Then, the relay server R1 performs a change notification setting process using a notification event between the relay server R1 and the relay server R2 by the use of a SUBSCRIBE method to the relay server R2 (step S11). Accordingly, every when details of the relay group information 100 stored in the relay server R2 is changed, the changed information is transmitted from the relay server R2 to the relay server R1 by the use of the NOTIFY method.

The SUBSCRIBE method is one processing means defined in the SIP. After the change notification setting process is performed using the SUBSCRIBE method, a change notification process using a notification even is performed in a period when the notification even is possible. That is, every when the information stored in the device having received the SUBSCRIBE method is changed, new information is notified to the device having transmitted the SUBSCRIBE method by the use of the NOTIFY method.

Similarly, on the contrary, the relay server R2 performs the change notification setting process between the relay server R2 and the relay server R1 by the use of the SUBSCRIBE method to the relay server R1 (step S12). Accordingly, even when details of the relay group information 100 stored in the relay server R1 is changed, the changed information is transmitted from the relay server R1 to the relay server R2 by the use of the NOTIFY method.

Here, since the change notification setting process is first performed, the party having received the SUBSCRIBE method performs a notification process and the relay server R of the party having transmitted the SUBSCRIBE method creates new relay group information 100a.

Figure 8:
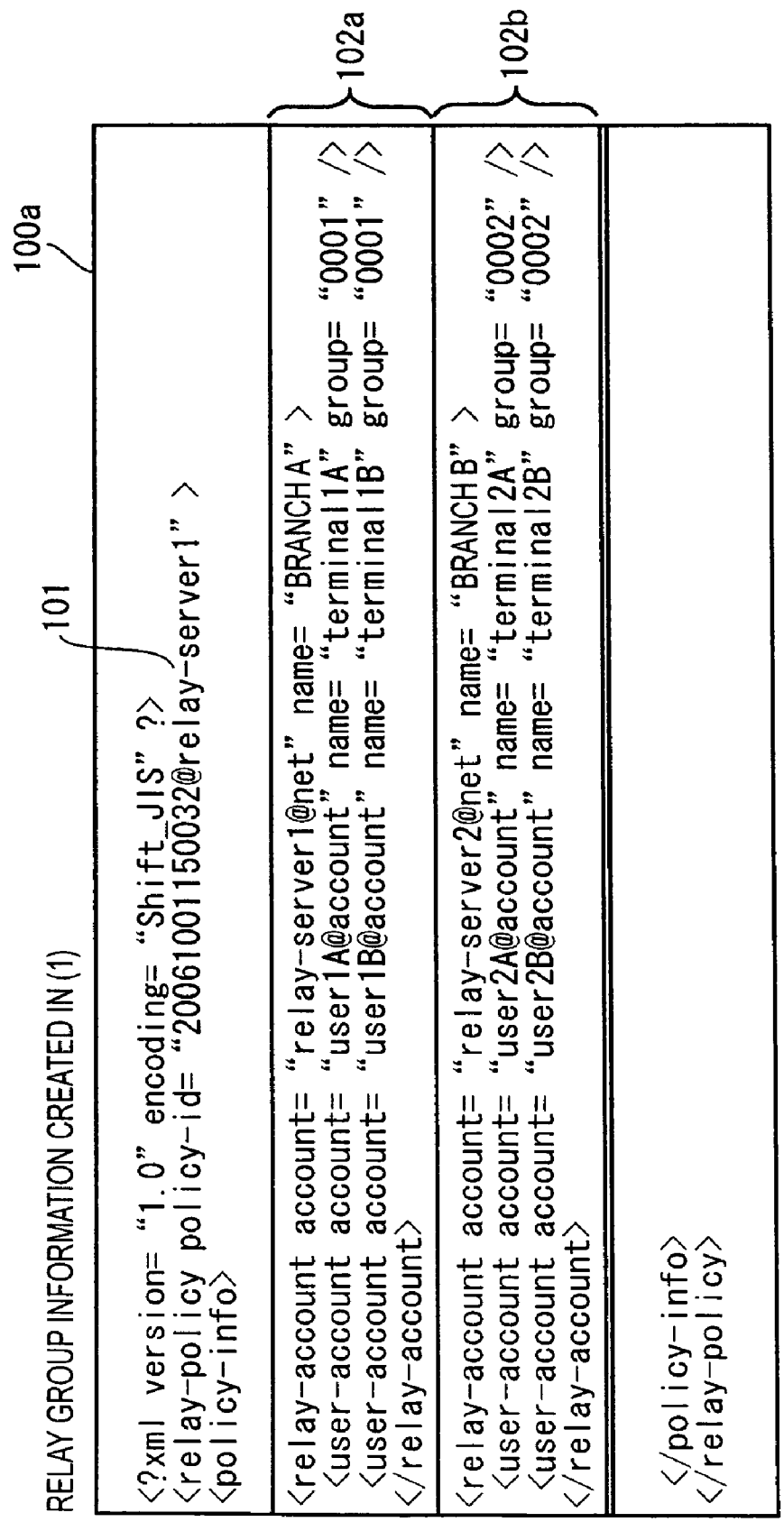
FIG. 8 is a diagram illustrating details of relay group information.

The relay group information 100a is shown in FIG. 8. Here, since the relay server R1 and the relay server R2 form a group, both relay account information 102a and 102b is include in the relay group information 100a. That is, the relay account information 102b of the relay server R2 is notified in the NOTIFY method of step S11. The relay account information 102a of the relay server R1 is notified in the NOTIFY method of step S12. The relay group information 100a having the same details is created by both parties. The created relay group information 100a is stored in the relay group information DB 505.

Steps S13 to S16 show a step of adding a relay server R3 to a relay group including the relay server R1 and the relay server R2 formed in steps S10 to S12.

An operator or the like specifies a group with reference to the group identification information 101. The relay server R2 transmits a connection request command (INVITE method) to the relay server R3 on the basis of the operator's operation or the like (step S13). In response to the transmission, the relay server R3 transmits an OK response to the relay server R2. Similarly to steps S11 and S12, a change notification setting process using the SUBSCRIBE method is performed between the relay servers R2 and R3 (steps S14 and S15). The changed information is transmitted by the use of the NOTIFY method and new relay group information 100b is created.

The relay group information 100b is shown in FIG. 9. Here, since three relay servers R1, R2, and R3 form one group, the relay group information 100b includes relay account information 102a, 102b, and 102c. That is, the relay account information 102c of the relay server R3 is notified in the NOTIFY method of step S14. The relay account information 102a and 102b stored in the relay server R2 is notified in the NOTIFY method of step S15. The relay group information 100b is created by both parties. The new relay group information 100b is stored in the respective relay group information DBs 505.

The relay group information 100 which the relay server R2 stores in the relay group information DB 505 is changed due to step S14. As a result, the changed information is transmitted to the relay server R1 (step S16) on the basis of the change notification setting process of step S11. Specifically, the relay account information 102c of the relay server R3 is transmitted to the relay server R1. In the relay server R1, the relay group information 100b shown in FIG. 9 is created and stored in the relay group information DB 505.

When any relay group information 100 is changed, the changed details are automatically updated between the relay server R1 and the relay server R2 and between the relay server R2 and the relay server R3 by the use of the above-mentioned communication process. Accordingly, even when the account of the relay server R or the client terminal T is changed, the relay communication system can dynamically cope with the change. The relay group information 100 can be formed between arbitrary relay servers R and may be plural.

Resource Sharing Process

A flow of a communication process for sharing resources will be described now with reference to the processing sequence diagrams shown in FIGS. 10 and 14.

Figure 10:
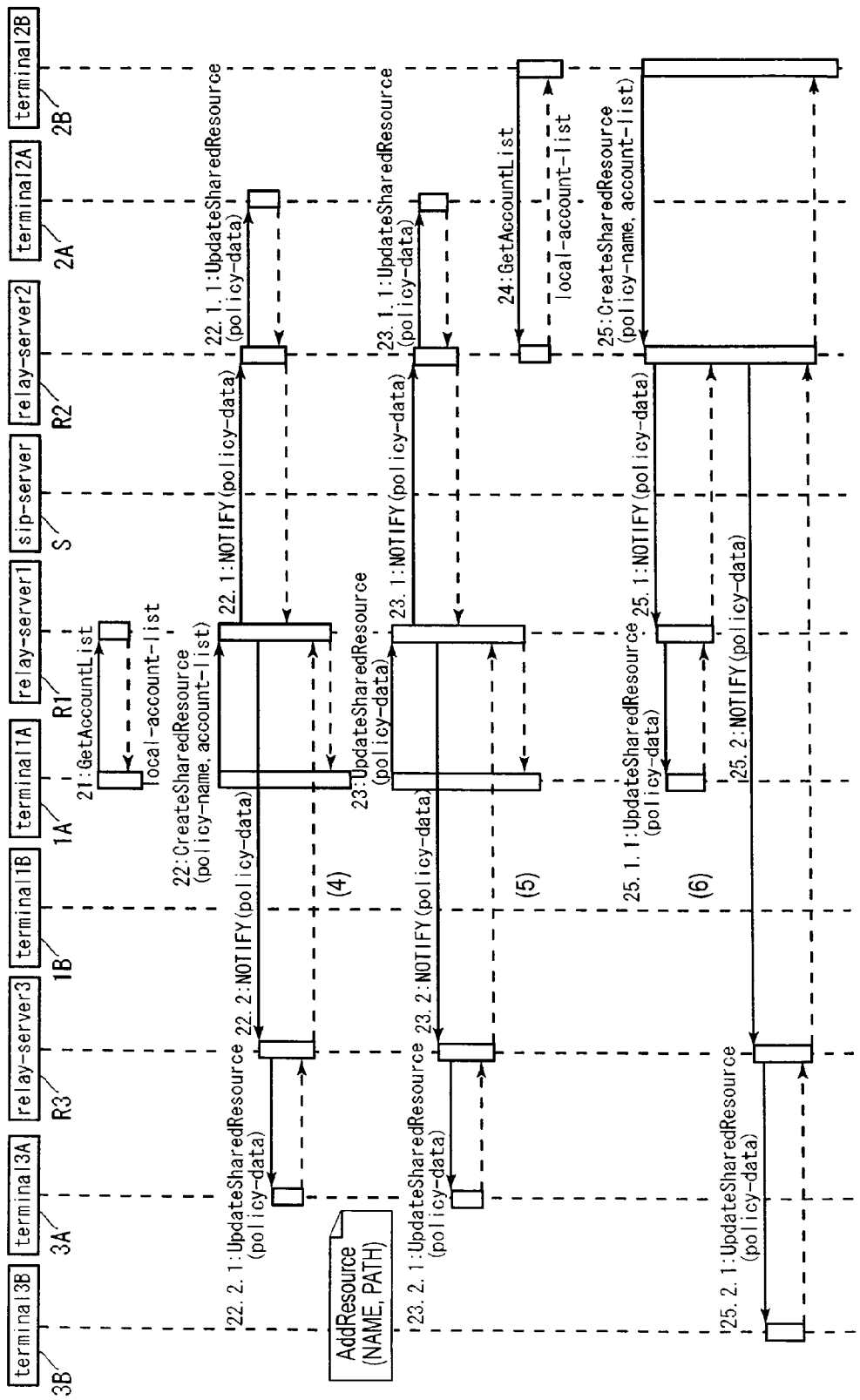
FIG. 10 is a sequence diagram illustrating a communication process.

In FIG. 10, the client terminal 1A transmits an account information transmitting request (GetAccountList command) to the relay server R1 (step S21). In response to the request, the relay server R1 transmits the details of the relay group information stored therein, that is, the relay account information 102, to the client terminal 1A. The relay account information 102 is displayed in the client terminal 1A. With the client terminal 1A, the user selects and designates the user client terminals T sharing the resource with reference to the relay account information 102. Here, the client terminals 2A and 3A are designated as the user client terminals.

The designated client terminal 1A transmits a shared resource creating request (CreateSharedResource command) including information on the user client terminals 2A and 3A to the relay server R1 (step S22). The relay server R1 having received the shared resource creating request stores the created shared resource information 120 in its shared resource information DB 506. The relay server R1 transmits the created shared resource information 120 to the relay servers R2 and R3 connected to the designated user client terminals 2A and 3A by the use of the NOTIFY method (steps S22.1 and S22.2).

The notified relay servers R2 and R3 store the shared resource information 120 in their shared resource information DB 506. Then, the relay servers R2 and R3 transmits a shared resource changing request (UpdateSharedResource command) to the designated user client terminals 2A and 3A (steps S22.1.1 and S22.2.1). The notified user client terminals 2A and 3A change the shared resource information 120 stored in their shared resource information DB 604.

Figure 11:
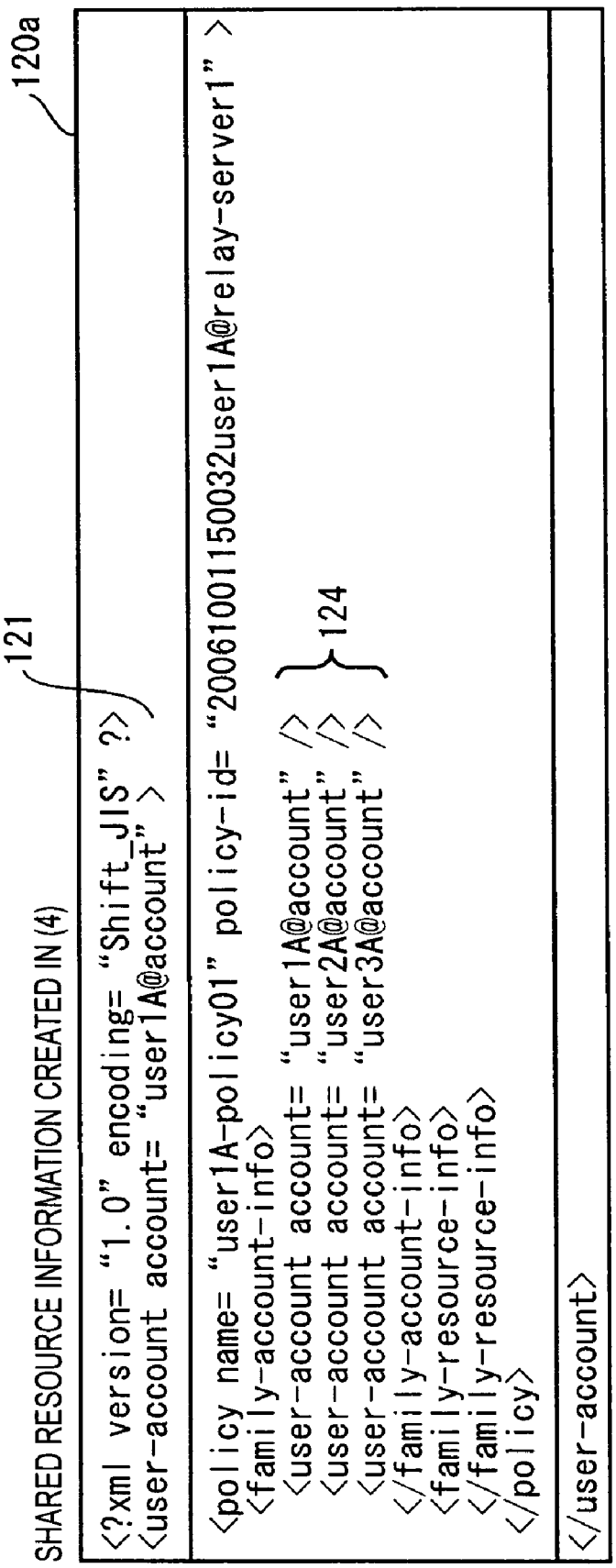
FIG. 11 is a diagram illustrating details of shared resource information.

The shared resource information 120a stored in the relay servers R1, R2, and R3 and the client terminals 1A, 2A, and 3A in steps S22 to S22.2.1 is shown in FIG. 11. The shared resource information 120a includes shared resource identification information 121 for identifying the shared resource information at a glance and family account information 124 which is a set of the account of the owner client terminal 1A and the accounts of the designated user client terminals 2A and 3A.

The process of adding the resource information 126 indicating essences of the shared resources to the shared resource information 120 is performed by a user's operation using the client terminal 1A. That is, the user selects an essence of a shared resource among essences of resources operable by the client terminal 1A and designates the essence of the selected resource with the client terminal 1A. Here, "folderA", "folder001.xls", "file002.wrd", and "file003.pdf" are designated.

The designated client terminal 1A transmits a shared resource changing request (UpdateSharedResource command) including the designated information to the relay server R1 (step S23). The relay server R1 having received the shared resource changing request stores the changed shared resource information 120b in its shared resource information DB 506. The relay server R1 transmits the changed shared resource information 120b to the relay servers R2 and R3 connected to the user client terminals 2A and 3A by the use of the NOTIFY method (steps S23.1 and S23.2).

The notified relay servers R2 and R3 store the shared resource information 120b in its shared resource information DB 506. The relay servers transmit the shared resource changing request (UpdateSharedResource command) to the user client terminals 2A and 3A (steps S23.1.1 and S23.2.1). The user client terminals 2A and 3A having received the request change the shared resource information 120 stored in their shared resource information DB 604.

The shared resource information 120b stored in the relay servers R1, R2, and R3 and the client terminals 1A, 2A, and 3A in steps S23 to S23.2.1 is shown in FIG. 12. In the shared resource information 120b, family resource information 125a is added to the shared resource information 120a created in step S22.

Referring to the shared resource information 120b created by the above-mentioned communication processes, it can be specified that the client terminal 1A is the owner client terminal and that the client terminals 2A and 3A are the user client terminals T. The details of the essences of the resources which can be operated by the owner client terminal 1A and existing positions in the network can be specified.

A step of allowing the client terminal 2B to newly perform a process of creating the shared resource information 120 is described now.

The client terminal 2B transmits an account information transmitting request (GetAccountList command) to the relay server R2 (step S24). In response to the request, the relay server R2 transmits the details of the relay group information 100 stored therein, that is, the relay account information 102, to the client terminal 2B. The relay account information 102 is displayed in the client terminal 2B. With the client terminal 1A, the user selects and designates the user client terminals T sharing the resource with reference to the relay account information 102. Here, the client terminals 1A and 3B are designated as the user client terminals.

The designated client terminal 2B transmits a shared resource creating request (CreateSharedResource command) including information on the user client terminals 1A and 3B to the relay server R2 (step S25). The relay server R2 having received the shared resource creating request stores the created shared resource information 120 in its shared resource information DB 506. The relay server R2 transmits the created shared resource information 120 to the relay servers R1 and R3 connected to the designated user client terminals 1A and 3B by the use of the NOTIFY method (steps S25.1 and S25.2).

The notified relay servers R1 and R3 store the shared resource information 120 in their shared resource information DB 506. Then, the relay servers R1 and R3 transmits a shared resource changing request (UpdateSharedResource command) to the designated user client terminals 1A and 3B (steps S25.1.1 and S25.2.1). The notified user client terminals 1A and 3B change the shared resource information 120 stored in their shared resource information DB 604.

Share resource information 120c stored in the relay servers R1, R2, and R3, and the client terminal 1A is shown in FIG. 13. In the shared resource information 120c, newly created individual shared resource information 122a is added to the shared resource information 120b created in step S23. New shared resource identification information 123a is given to the newly created individual resource information 122a.

Since client terminals 2B and 3B are not associated with the shared resource information 120b previously created, the newly created individual shared resource information 122a is stored as the shared resource information 120 in the client terminals 2B and 3B.

Figure 14:
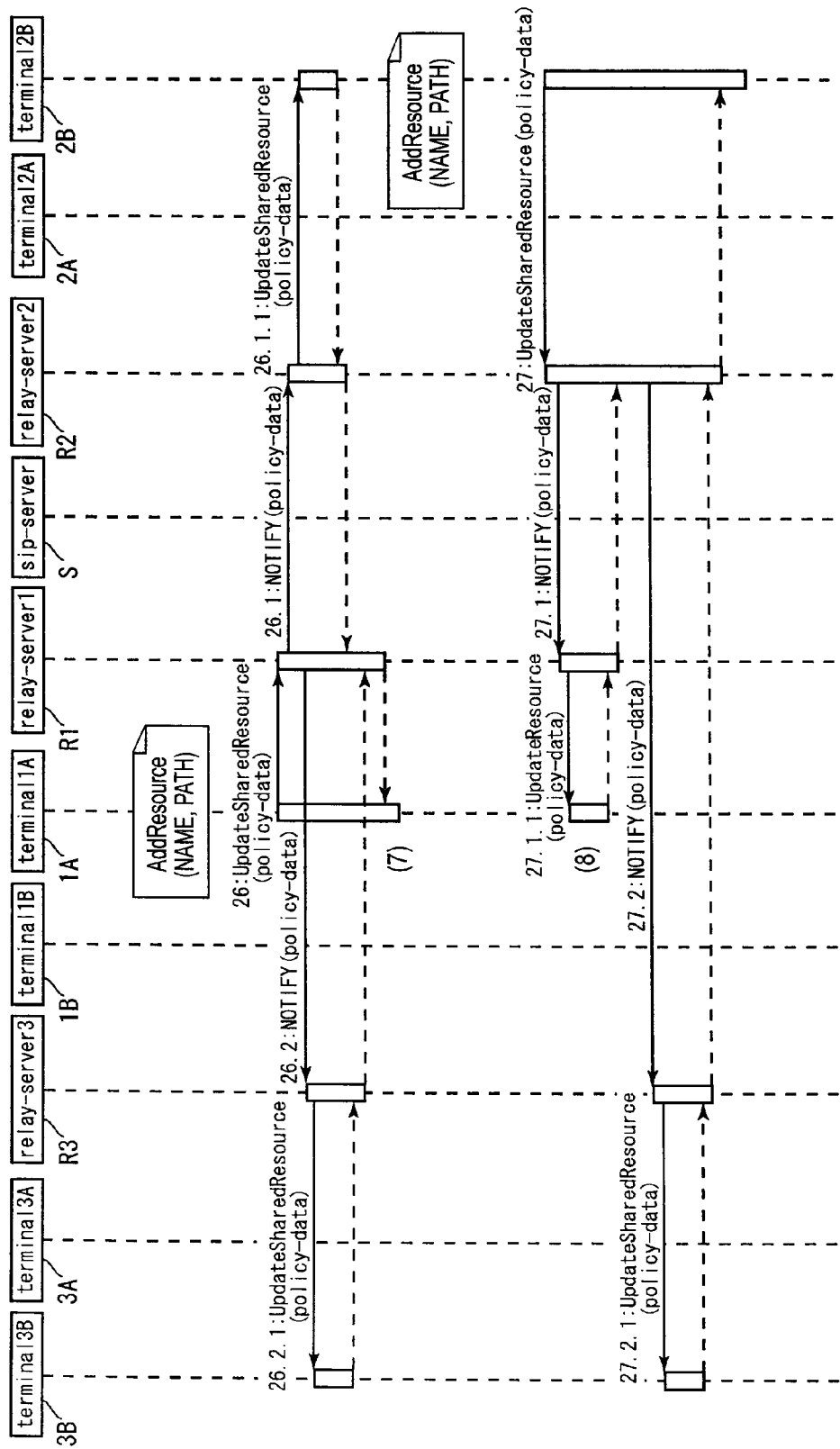
FIG. 14 is a sequence diagram illustrating a communication process.

FIG. 14 shows a flow of a communication process when a process of adding the resource information 126 of the resource shared by the client terminal 1A to the newly created individual shared resource information 122a is performed.

The user selects the individual shared resource information 122a to which the resource is added among the shared resource information 120c on the basis of the shared resource identification information 123a and designates the selected information with the client terminal 1A. The user selects a shared resource among the essences of the resources which can be operated by the client terminal 1A and designates the selected resource with the client terminal 1A. Here, "file005.ppt" is designated.

The designated client terminal 1A transmits a shared resource changing request (UpdateSharedResource command) including the designated information to the relay server R1 (step S26). The relay server R1 having received the shared resource changing request stores the changed shared resource information 120d in its shared resource information DB 506. The relay server R1 transmits the changed individual shared resource information 122a to the relay servers R2 and R3 connected to the user client terminals 2B and 3B sharing the resource by the use of the NOTIFY method (steps S26.1 and S26.2).

The notified relay servers R2 and R3 change and store the shared resource information 120 in its shared resource information DB 506. The relay servers transmit the shared resource changing request (UpdateSharedResource command) to the user client terminals 2B and 3B (steps S26.1.1 and S26.2.1). The user client terminals 2B and 3B having received the request change the shared resource information 120 stored in their shared resource information DB 604.

The shared resource information 120d stored in the relay servers R1, R2, and R3 and the client terminal 1A is shown in FIG. 15. In the shared resource information 120d, family resource information 125b is added to the individual shared resource information 122a of the shared resource information 120c created in step S25. The changed individual shared resource information 122a is stored as the shared resource information 120 in the client terminals 2B and 3B.

A flow of a communication process when a process of adding the resource information 126 of the resource shared by the client terminal 2B to the newly created individual shared resource information 122a is performed is shown in FIG. 14.

The user selects the individual shared resource information 122a to which the resource is added among the shared resource information 120 on the basis of the shared resource identification information 123a and designates the selected information with the client terminal 2B. The user selects a shared resource among the essences of the resources which can be operated by the client terminal 2B and designates the selected resource with the client terminal 2B. Here, "folderC", "file00A.ppt", and "file00B.ppt" are designated.

The designated client terminal 2B transmits a shared resource changing request (UpdateSharedResource command) including the designated information to the relay server R2 (step S27). The relay server R2 having received the shared resource changing request stores the changed shared resource information 120e in its shared resource information DB 506. The relay server R2 transmits the changed individual shared resource information 122a to the relay servers R1 and R3 connected to the user client terminals 1A and 3B sharing the resource by the use of the NOTIFY method (steps S27.1 and S27.2).

The notified relay servers R1 and R3 change and store the shared resource information 120 in its shared resource information DB 506. The relay servers transmits the shared resource changing request (UpdateSharedResource command) to the user client terminals 1A and 3B (steps S27.1.1 and S27.2.1). The user client terminals 1A and 3B having received the request change the shared resource information 120 stored in their shared resource information DB 604.

The shared resource information 120e stored in the relay servers R1, R2, and R3 and the client terminal 1A is shown in FIG. 16. In the shared resource information 120e, family resource information 125c is added to the individual shared resource information 122a of the shared resource information 120d created in step S26. The changed individual shared resource information 122a is stored as the shared resource information 120 in the client terminals 2B and 3B.

In this way, the client terminals T can form a set of client terminals sharing the resources. The client terminals T can change the shared resources by a desired amount as needed and thus can constitute a relay communication system which is excellent in expansibility and flexibility.

Indirect Operation of Shared Resource

Figure 17:
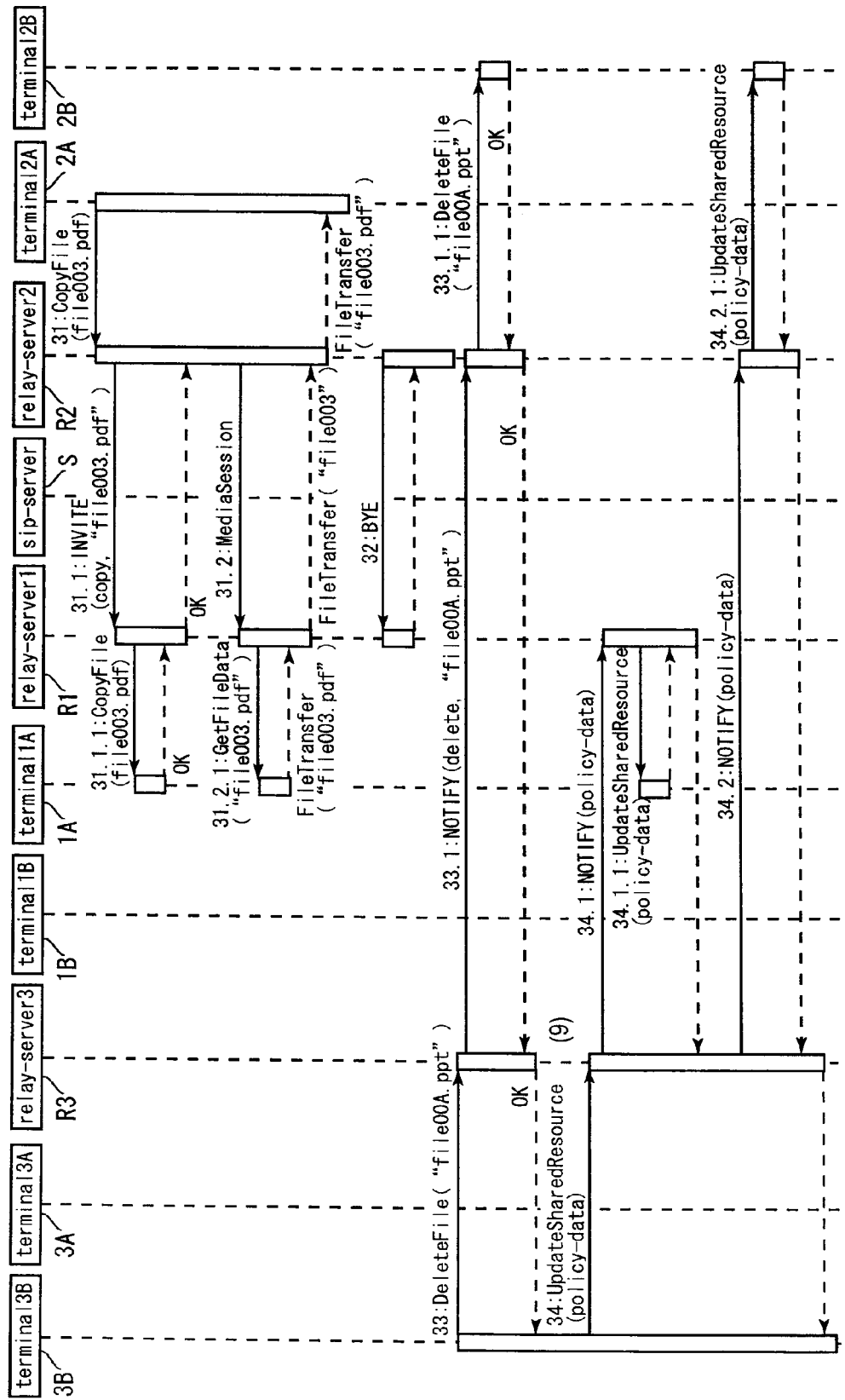
FIG. 17 is a sequence diagram illustrating a communication process.

FIG. 17 shows a flow of a communication process of allowing a client terminal T in a LAN to indirectly operate a resource held by a client terminal T in a different LAN over the Internet.

The first process shows a flow when the client terminal 2A in the LAN2 indirectly copies a resource held and operated by the client terminal 1A in the LAN1.

The client terminal 2A transmits a copy request (Copyfile command) to the relay server R2 when receiving an instruction to copy "file003.pdf" from a user (step S31). The relay server R2 having received the copy request selects the owner client terminal T holding "file003.pdf" as a copy target on the basis of the shared resource information 120. The relay server R2 selects the relay server R connected to the owner client terminal T on the basis of the relay group information 100 and communicates with the selected relay server. When "file003.pdf" is not a shareable resource or when the account of the client terminal 2A is not registered, the communication is not made.

Subsequently, the relay server R2 transmits a connection request (INVITE method) to the selected relay server R1 through the external server S (step S31.1). The relay server R1 having received the connection request transmits a copy request to the client terminal 1A (step S31.1.1). The client terminal 1A having received the copy request transmits an OK response to the relay server R1 when it can operate the resource (file003.pdf) as a copy target. The relay server R1 transmits the OK response to the relay server R2.

The relay server R2 having received the OK response transmits a Mediasession command to the relay server R1 and a communication passage is established between the relay servers R1 and R2 (step S31.2). The relay server R1 having received the Mediasession command transmits a GetFileData command for copying a file to the client terminal 1A to request for copying a file (step S31.2.1). The client terminal 1A having received the file copy request copies "file003.pdf" as a copy target from the resource storing unit 603 and transmits the copied file to the relay server R1. "fileoo3.pdf" is transmitted to the client terminal 2A through the relay server R1 and the relay server R2 (FileTransfer command). The essence of the resource may be copied from the file server F, as well as the resource storing unit 603.

When a series of communication processes are ended, the relay server R2 transmits a cutting request (BYE method) to the relay server R1 so as to cut the established communication path, thereby ending the communication between both relay servers (step S32).

The next flow is a flow when the client terminal 3B in the LAN 3 indirectly deletes an operable resource which is held by the client terminal 2B in the LAN2.

When receiving an instruction for deleting "file00A.ppt" from a user, the client terminal 3B transmits a Deletefile command for deleting a file to the relay server R3 to request for the deletion (step S33). The relay server R3 having received the deleting request specifies the owner client terminal T holding and operating "file00A.ppt" as a deletion target and a relay server R connected to the owner client terminal T on the basis of the shared resource information 120 and the relay group information 100.

The relay server R3 transmits information on the deleting request to the specified relay server R2 through the external server S by the use of the NOTIFY method (step S33.1). The relay server R2 having received the information on the deleting request transmits a Deletefile command to the client terminal 2B to request for the deletion (step S33.1.1). The client terminal 2B having received the deleting request deletes the resource (file00A.ppt) as a deletion target from the resource storing unit 603. An OK response is transmitted to the client terminal 3B through the relay server R2 and the relay server R3.

FIG. 18 shows shared resource information 120f after the deletion process is performed. As shown in FIG. 18, the resource information 126 of "file00A.ppt" as a deletion target is deleted from the shared resource information 120. The essence of the resource is deleted.

When an operation of changing the details of the shared resource information 120 such as the deletion of a resource has been performed, a process of updating the shared resource information is subsequently performed.

Specifically, the client terminal 3B having been instructed to perform an operation accompanying the change of the shared resource information 120 transmits a shared resource changing request (UpdateSharedResource command) to the relay server R3 (step S34). The relay server R3 having received the changing request transmits the changed shared resource information 120 to the relay servers R1 and R2 associated with the changed shared resource information 120 by the use of the NOTIFY method (steps S34.1 and S34.2). The relay servers R1 and R2 update and store the shared resource information in their shared resource information DB 506.

The relay servers R1 and R2 transmit the shared resource changing request (UpdateSharedResource command) to the user client terminals 1A and 2B associated with the changed shared resource information 120 (steps S34.1.1 and S34.2.1). The user client terminals 1A and 2B having received the changing request changes the shared resource information stored in their shared resource information DB 604.

That is, when the shared resource information 120 is changed, the fact is notified to the associated relay servers R and the associated client terminals T and the shared resource information 120 is updated at once.

As described above, in the relay communication system, the client terminal T can operate a resource held by a different client terminal T over the WAN as if it holds the resource. The client terminals T can form a group with necessary opposites as needed and share the resources held by the client terminals as needed. Even when a resource is changed due to the deletion and the like, the information on the resource is automatically updated. Accordingly, the client terminals T can dynamically cope with the deletion of the resource and the like. Without being aware that files are managed in accordance with different protocols in the LANs, it is possible to operate the resource by the use of the client terminals.

Second Embodiment

Entire Configuration of Relay Communication System

A second embodiment of the invention will be described now. The second embodiment is similar to the first embodiment in configurations of a relay communication system, an external server S, a relay server R, and a file server F, but the second embodiment is different from the first embodiment in configuration of a client terminal T.

Figure 19:
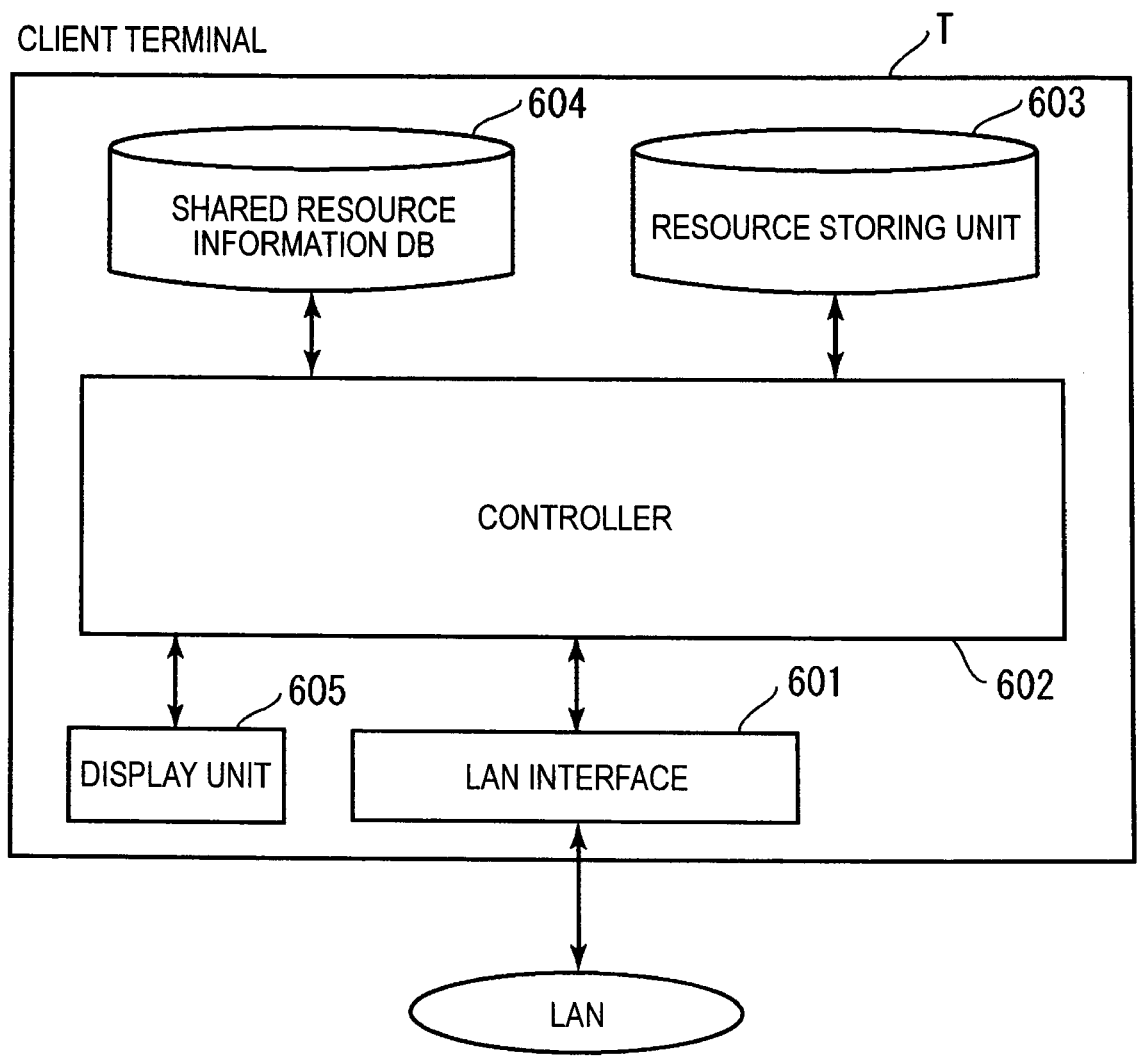
FIG. 19 is a functional block diagram illustrating a client terminal.

FIG. 19 is a functional block diagram illustrating a client terminal T. The client terminal T according to this embodiment further includes a display unit 605 in addition to the constituent elements of the client terminal T according to the first embodiment. The display unit 605 displays relay group information 100 shown in FIG. 20 and the like and shared resource information 120 shown in FIG. 21 and the like.

Display Screen for Relay Group Information and Shared Resource Information

A flow of processes of the client terminal T in the relay communication system will be described with reference to the flowcharts of FIGS. 22 and 23. The relay group information 100 shown in FIG. 20 and the shared resource information 120 shown in FIG. 21 are created in advance.

Figure 22:
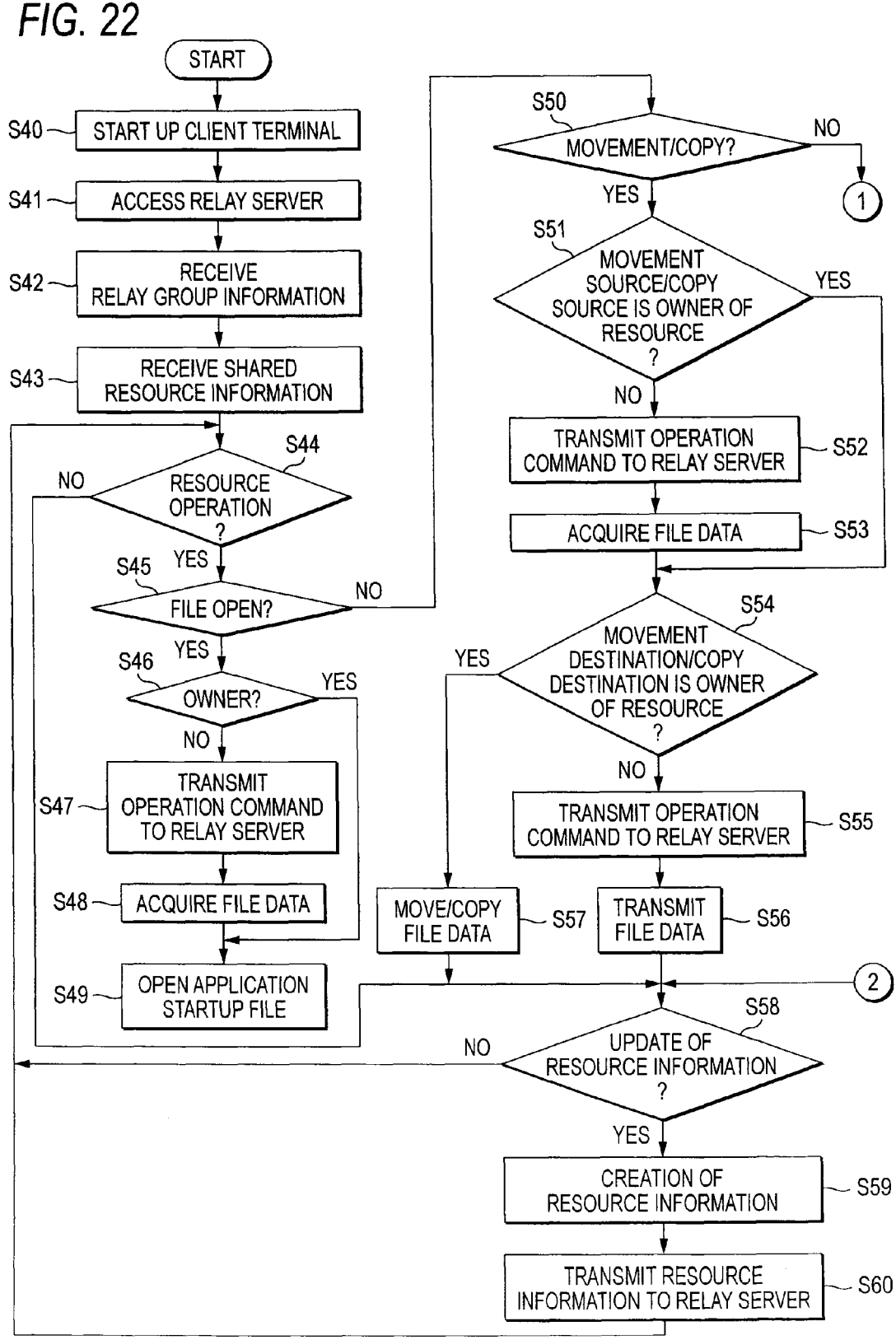
FIG. 22 is a flowchart illustrating a process of a client terminal.

First, as shown in FIG. 22, the client terminal T (operating client terminal T) to perform an operation is started up by an operator's operation (step S40). Then, the operating client terminal T is connected to an intra-LAN relay server R by the operator's operation or automatically (step S41) and receives the relay group information 100 from the intra-LAN relay server R (step S42).

Figure 24:
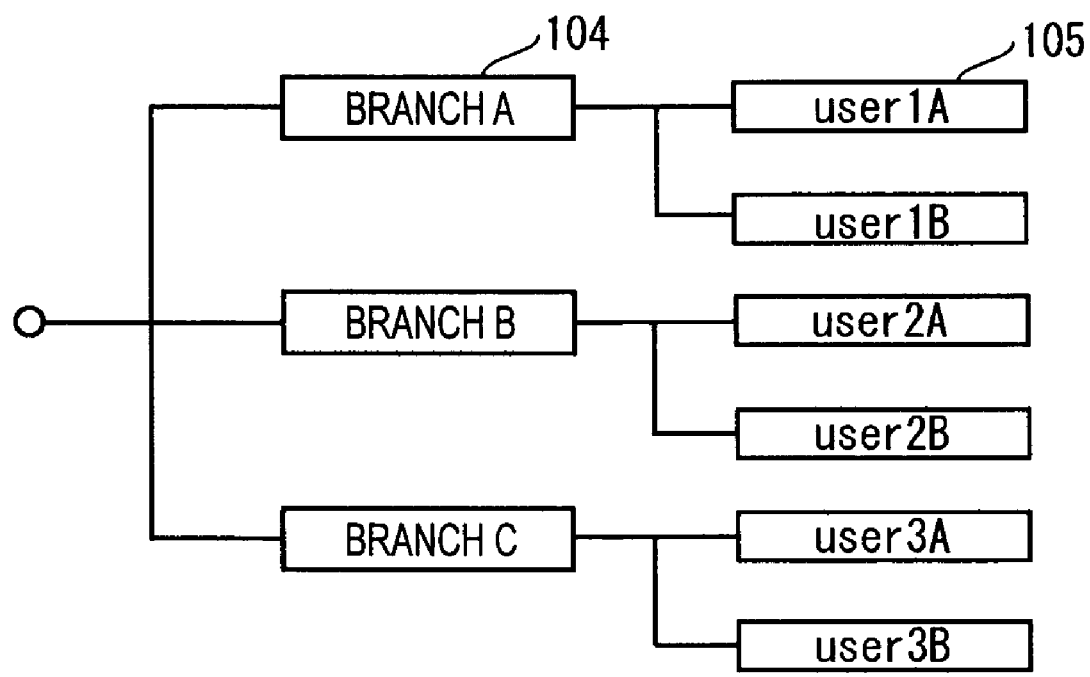
FIG. 24 is a diagram illustrating details of relay group information which is displayed in a client terminal.

Details of the received relay group information 100 can be displayed on the display unit 605. The image thereof is shown in FIG. 24. As shown in FIG. 24, the details of the relay group formed currently to correspond to the relay group information 100 shown in FIG. 20 are displayed. Accordingly, an operator can easily see which LANs form a group (here, branch A, branch B, and branch C form a group). The operator can also easily see what client terminals T are registered in the LANs (for example, user1A and user1B are registered in branch A).

Figure 25:
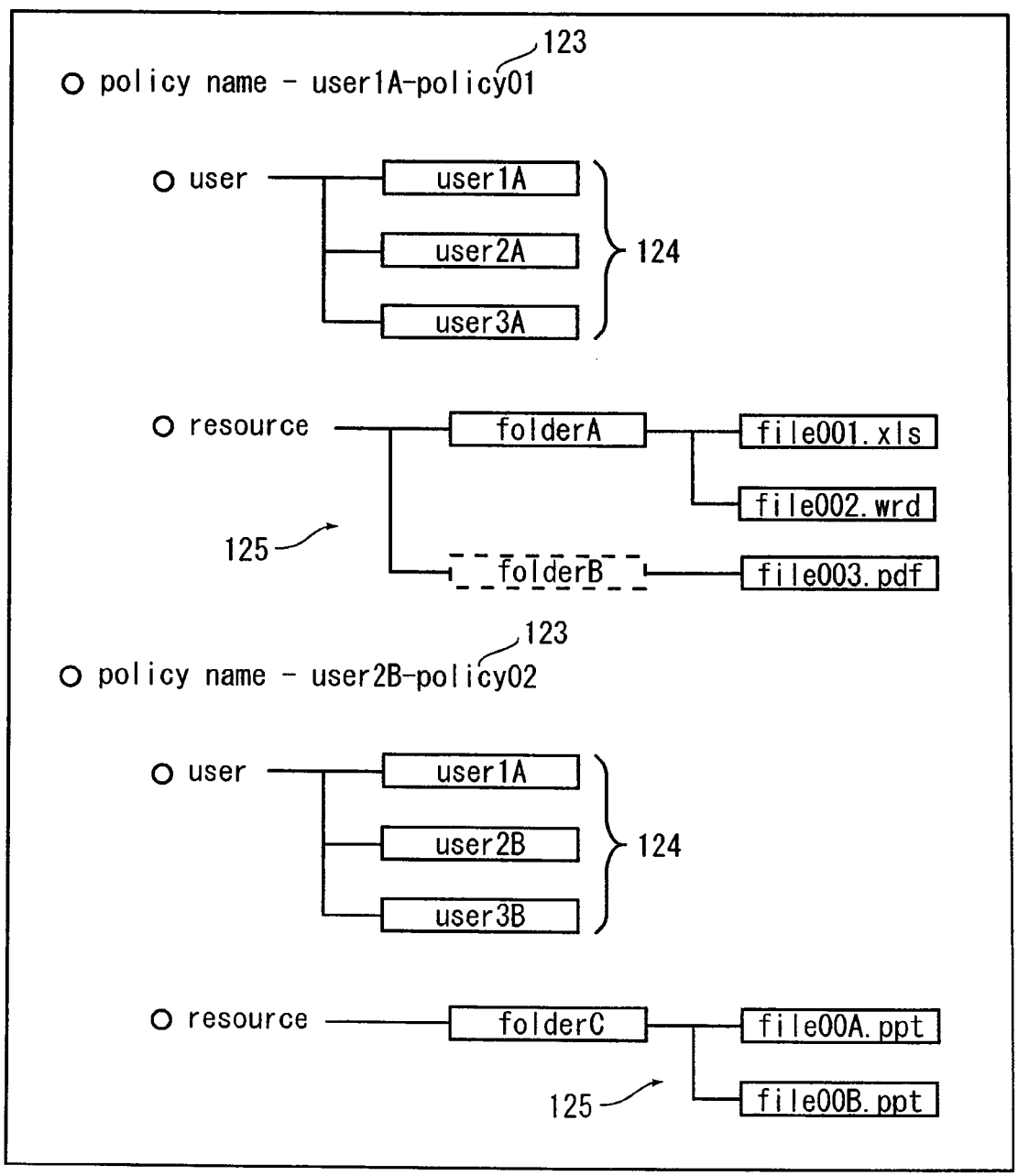
FIG. 25 is a diagram illustrating details of shared resource information which is displayed in a client terminal.

The operating client terminal T receives the shared resource information 120 form the intra-LAN relay server R (step S43). The details of the received shared resource information 120 can be displayed on the display unit 605. The image thereof is shown in FIG. 25. As shown in FIG. 25, the details of the individual shared resource information 122 associated with the operating client terminal T, which is included in the shared resource information 120 shown in FIG. 21, is simplified and displayed. That is, shared resource identification information 123, family account information 124, and family resource information 125 are simplified and displayed respectively. The operator can specify the client terminals T sharing a resource with the operating client terminal by only seeing the display, and thus can easily know the type and location of the shared resource. The operator can move to a screen for processing the resource by operating (clicking) the displayed resource and thus perform various processes.

As described above, the operating client terminal T displays information on different accessible client terminals T to the operator by the use of the relay group information 100, whether the client terminals T should be located inside or outside a LAN. The operating client terminal T displays information on client terminals T sharing a resource or information on operable resources to the operator by the use of the shared resource information 120, whether the client terminals T should be located inside or outside a LAN.

File Opening Process

The operator can operate the resources on the basis of the displayed relay group information 100 and the displayed shared resource information 120. For example, the operator can operate the resources by setting usable operation types for the resources in advance and selecting a proper operation therefrom. Here, it is assumed that four processes of a process of opening a resource (file), a process of moving or copying a resource, a process of storing a resource, and a process of deleting a resource are set as specific examples.

In this case, the operating client terminal T determines whether an instruction to operate a resource has been given by an operator's operation (step S44). The operating client terminal T processes individual steps S depending on the operation details of the resource, when determining that the instruction to operate the resource has been given (YES in step S44).

Specifically, the operating client terminal T determines whether the operator's instruction is a file opening process (step S45). Here, the file is only an example, and an opening target may be another type of resource such as a folder.

When determining that the instruction is a file opening process (YES in step S45), the operating client terminal T determines whether it is an owner of the file by checking the shared resource information 120 (step S46). That is, the operating client terminal T determines whether it is an owner client terminal T which can directly operate the file. As a result, when determining that it is not an owner of the file (NO in step S46), the operating client terminal T transmits an operation command for opening the file (step S47) and acquires data of the file to be operated (step S48).

Specifically, the intra-LAN relay server R checks that it belongs to the relay group with reference to the relay group information 100 and specifies an extra-LAN relay server R to which the owner client terminal T of the file to be operated is connected. The intra-LAN relay server R transmits an operation command to the extra-LAN relay server R through the external server S. The extra-LAN relay server R having received the operation command transmits the operation command to the owner client terminal T. The owner client terminal T which has received the operation command and which can directly operate the file as an operation target acquires the file and transmits the file to the operating client terminal T having instructed the operation.

The operating client terminal T having acquired the file to be operated starts up application software to perform the file opening process (step S49). When determining that it is an owner (YES in step S46), the operating client terminal T which can directly operate the file performs the process of step S49.

File Moving or Copying Process

When the operation of a resource is not the file opening operation (NO in step S45), the operating client terminal T determines whether the operation is a file moving or copying process (step S50). The operating client terminal T determines whether it is an owner client terminal T of a file as a movement source or copy source by checking the shared resource information 120 (step S51). That is, the operating client terminal T checks whether it can directly operate the file to be operated as the movement source or the like.

As a result, when determining it is not an owner of the movement source or the like (NO in step S51), the operating client terminal T transmits an operation command for acquiring the file to the intra-LAN relay server R (step S52) and acquires data of the file to be operated (step S53). Steps S52 and S53 are similar to steps S47 and S48 and thus description thereof will be omitted. When determining that it is an owner of the file as the movement source or the like (YES in step S51), the operating client terminal T directly performs the operation, similarly. However, when it is determined that the operation is the file moving process, the owner client terminal T particularly performs a process of deleting the original file.

In this way, the operating client terminal T having acquired data of the file to be moved determines whether it is an owner client terminal T of a folder as a movement destination or copy destination by checking the shared resource information 120 (step S54). That is, the operating client terminal checks whether it can directly move or copy the acquired file.

As a result, when determining that it is not an owner of a folder as a movement destination or the like (NO in step S54), the operating client terminal T transmits an operation command for moving the file to the intra-LAN relay server R (step S55) and transmits the data of the acquired file to the owner client terminal T as a movement destination or copy destination (step S56). When determining that it is an owner of a folder as the movement destination or the like (YES in step S54), the operating client terminal T directly performs the file data moving or copying process (step S57).

Some operation of a resource such as movement of a file may accompany a variation in details of the shared resource information 120. For example, when a file is moved, the essence of the file disappears from the folder of the movement source and the essence of the file is added to the folder of the movement destination. Of course, this variation is displayed on the display unit 605 of the operating client terminal T so as to dynamically cope with the variation.

In this case, the shared resource information 120 is updated by the operating client terminal T having instructed to vary the details of the shared resource information 120.

That is, the operating client terminal T having instructed to operate the resource determines whether it is necessary to update the shared resource information by checking the shared resource information 120 (step S58). Specifically, the operating client terminal checks whether it can access a resource which can be directly and indirectly and which is included in the shared resource information 120. When there is a non-accessible resource, it is possible to see that a resource state varies.

When the resource state varies and it is determined that it is necessary to update information on the resource in the shared resource information 120 (YES in step S58), information on the varied resource is created (step S59) and the information on the resource is transmitted to the intra-LAN relay server R (step S60).

The intra-LAN relay server R having received the information on the resource updates the shared resource information 120 stored therein and transmits the shared resource information 120 to the extra-LAN relay server R associated with the updated shared resource information 120 through the external server S. The extra-LAN relay server R transmits the shared resource information 120 to the client terminal T associated with the shared resource information 120. The details of the shared resource information 120 stored in the client terminals is updated. When the operation does not accompany the variation in details of the shared resource information 120 (NO in step S58), the updating of the shared resource information 120 is not performed.

File Storing or Deleting Process

Figure 23:
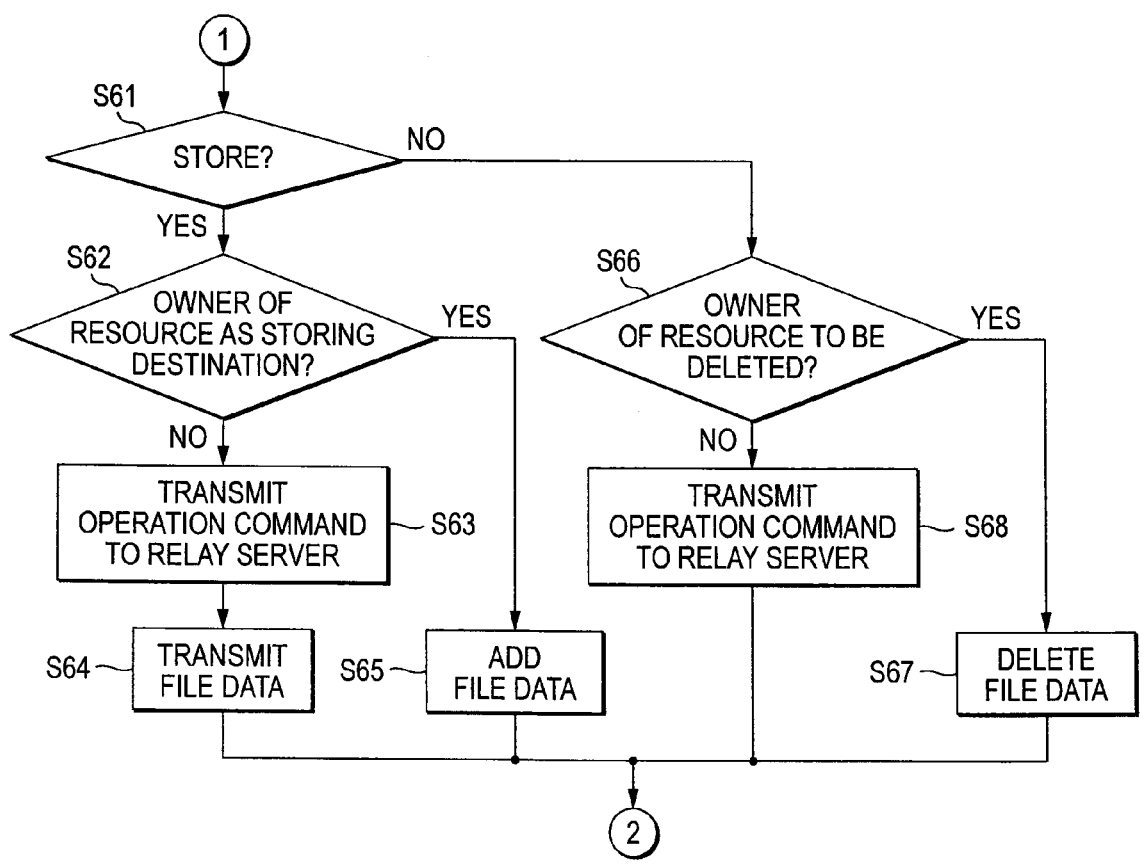
FIG. 23 is a flowchart illustrating a process of a client terminal.

Steps S61 to S65 shown in FIG. 23 show a file storing process.

That is, the operating client terminal T determines whether the operation is a file storing process (step S61). Then the operating client terminal T determines whether it is an owner client terminal T of a folder as a storing destination by checking the shared resource information 120 (step S62).

As a result, when determining that it is not the owner client terminal T of the folder as the storing destination (NO in step S62), the operating client terminal T transmits an operation command for storing a file to the intra-LAN relay server R (step S63). The data of the file is transmitted to the owner client terminal T of the folder as a storing destination (step S64). When the operating client terminal T is the owner client terminal T of the file (YES in step S62), the data of the file is directly added to the resources of the operating client terminal T (step S65).

Steps S66 to S68 shown in FIG. 23 show a process of deleting a resource.

The operating client terminal T determines whether it is an owner client terminal T of the resource to be deleted by checking the shared resource information 120 (step S66). When determining that it is an owner client terminal T of the resource to be deleted (YES in step S66), the operating client terminal T which can directly operate the file deletes the file at once (step S67).

When determining that it is not an owner client terminal T (NO in step S66), the operating client terminal T transmits an operation command for deleting a file to the intra-LAN relay server R (step S68). The operation command for deleting the file is finally transmitted to the owner client terminal T via the intra-LAN relay server R having received the command and the file to be deleted is deleted.

As shown in FIG. 22, after the process on the individual resources is finished, the processes of updating the shared resource information 120 in steps S58 to S60 described above are performed. Every when the details of the shared resource information 120 is changed by any operation, the information is automatically updated.

As shown in step S44 of FIG. 22, even at the time of starting up the operating client terminal T, the updating of the shared resource information 120 is performed. That is, when the operating client terminal T determines that no operation command for the resources is given (NO in step S44), the process of updating the shared resource information 120 (processes of steps S58 to S60) is performed. Accordingly, the shared resource information 120 is checked every time of starting up the client terminal T or operating a resource and is updated when any change in resources occurs. Accordingly, the relay communication system is embodied as a system excellent in expansibility and flexibility which can dynamically cope with a change in resource.

Third Embodiment

Entire Configuration of Relay Communication System

A third embodiment of the invention will be described now. The third embodiment is similar to the second embodiment in configurations of a relay communication system, an external server S, a client terminal T, and a file server F, but the third embodiment is different from the second embodiment in configuration of a relay server R.

Figure 26:
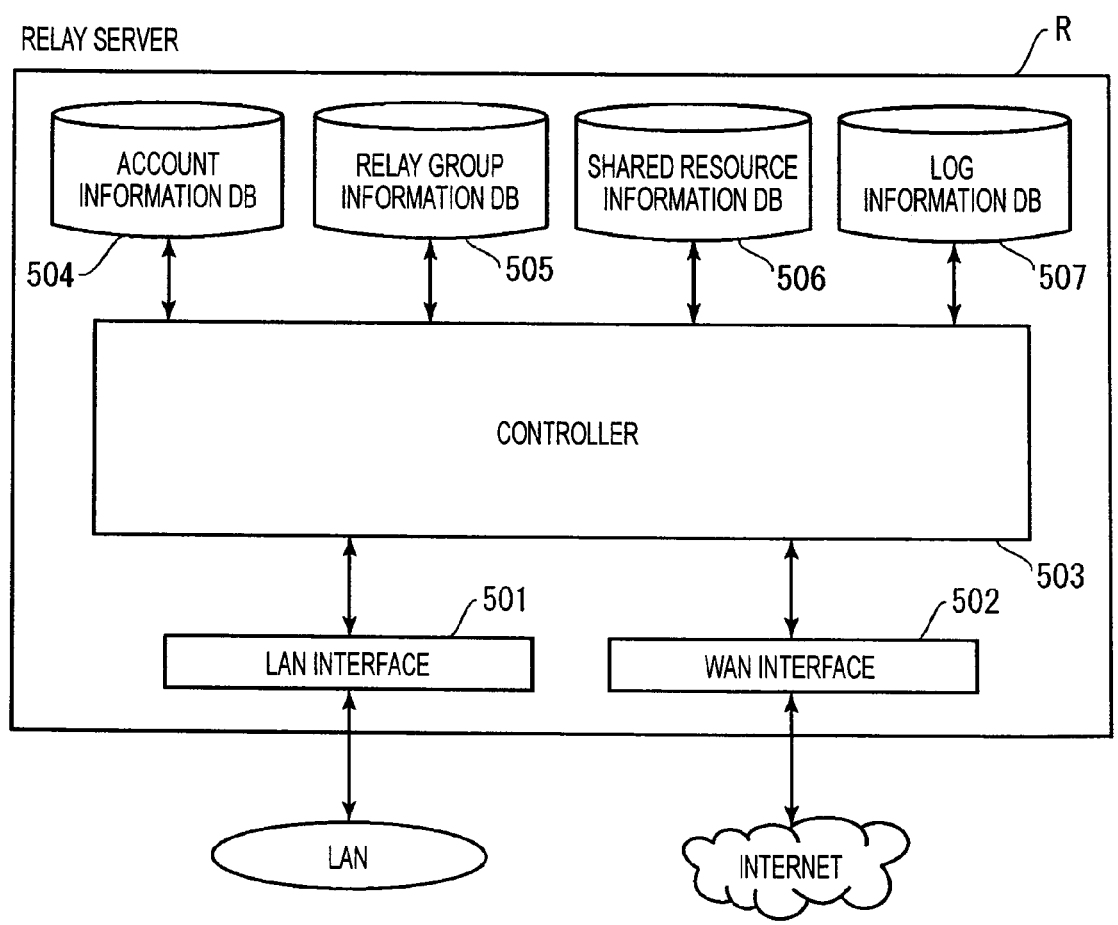
FIG. 26 is a functional block diagram illustrating a relay server.

FIG. 26 is a functional block diagram illustrating a relay server R. The relay server R according to this embodiment further includes a log information database (DB) 507 in addition to the constituent elements f the relay server R according to the second embodiment. The log information DB 507 is a database for managing operation details relayed by the relay servers R as log information.

Resource Operation Details stored as Log Information

Entire Summary of Resource Operation Details

Resource operation details according to this embodiment will be described with reference to FIGS. 27 to 29. Only the individual shared resource information 122 shown in the upper side of FIG. 21 is participated in the resource operation according to this embodiment. However, it is possible to acquire log information on the resource operation in which the individual shared resource information 122 shown in the lower side of FIG. 21 is participated. The relay group information 100 shown in FIG. 20 is associated with the resource operation according to this embodiment.

The details of the resource operation according to this embodiment are roughly divided into details of three operation states, which are stored as log information to be described in detail later and include (1) a state where the client terminal 2A is connected to the LAN2 before it moves to the LAN1, (2) a state where the client terminal 2A is connected to the LAN 1, and (3) a state where the client terminal 2A is connected to the LAN2 after it moves to the LAN1.

Resource Operation in State (1)

Figure 27:
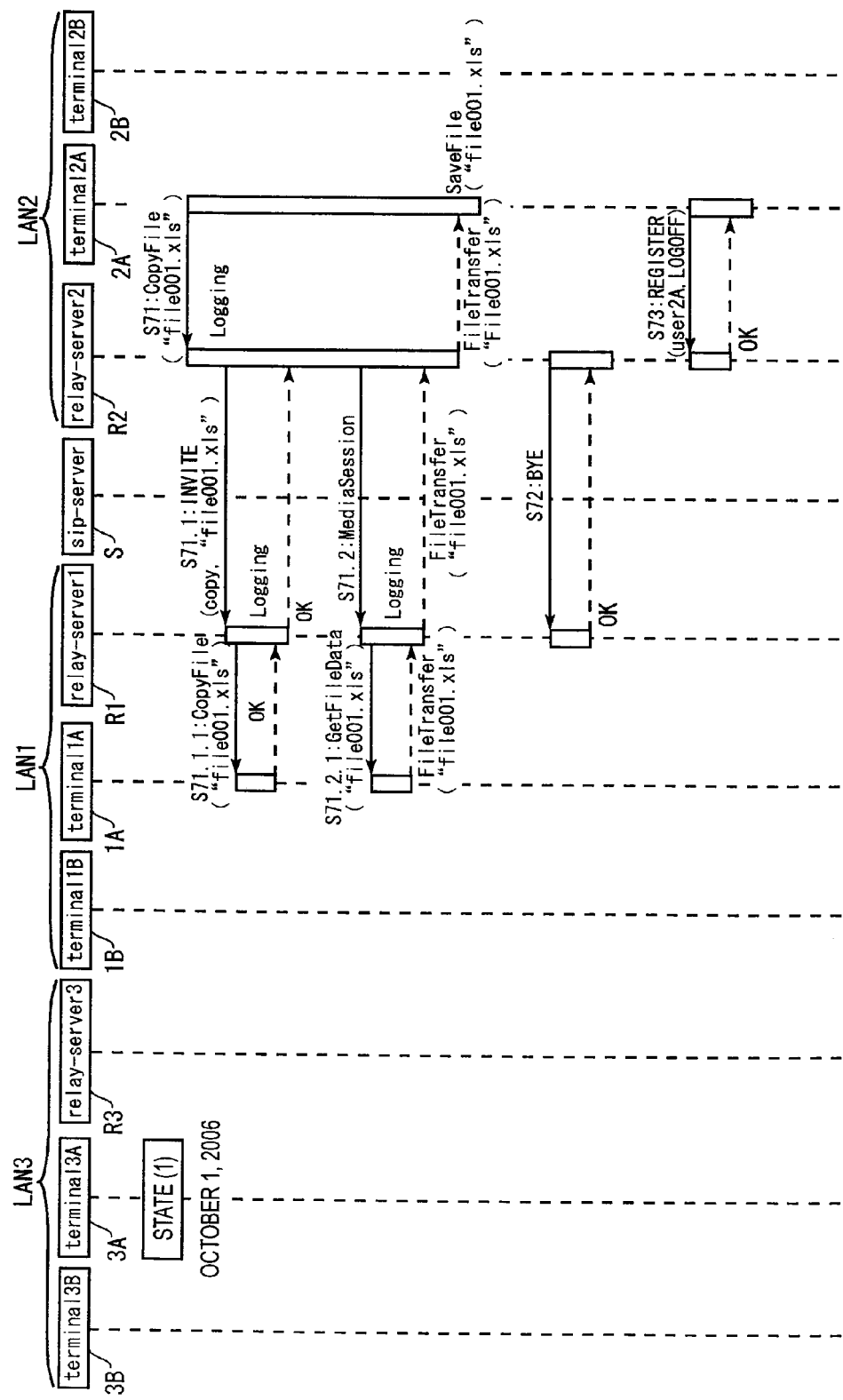
FIG. 27 is a sequence diagram illustrating a communication process in a state where a client terminal 2A is connected to a LAN2 before moving to a LAN1.

FIG. 27 is a sequence diagram illustrating a communication process in the state where the client terminal 2A is connected to the LAN2 before it moves to the LAN1. State (1) corresponds to a state where a user of the client terminal 2A usually goes to branch B having the LAN2.

When having been instructed to copy "file001.xls" by the user, the client terminal 2A transmits a copy request (CopyFile command) to the relay server R2 (step S71). The relay server R2 having received the copy request selects an owner client terminal 1A holding "file001.xls" to be copied on the basis of the shared resource information 120. Accordingly, the relay server R1 connected to the owner client terminal 1A is selected on the basis of the relay group information 100.

The relay server R2 transmits a connection request (INVITE method) to the selected relay server R1 through the external server S (step S71.1). The relay server R1 having received the connection request transmits a copy request to the client terminal 1A (step S71.1.1). The client terminal 1A having received the copy request transmits an OK response to the relay server R1 when it can operate "file001.xls" to be copied. The relay server R1 having received the OK response transmits the OK response to the relay server R2.

The relay server R2 having received the OK response transmits a MediaSession command to the relay server R1. Here, a communication path is established between the relay servers R1 and R2 (step S71.2). The relay server R1 having received the MediaSession command transmits a file acquiring request (GetFileData command) to the client file 1A (step S71.2.1). The client terminal 1A having received the file acquiring request copies "file001.xls" to be acquired from the resource storing unit 603 and transmits the copied file to the relay server R1. Then, "file001.xls" is transmitted to the client terminal 2A through the relay servers R1 and R2 (FileTransfer command).

When a series of communication processes are ended, the relay server R2 transmits a cutting request (BYE method) to the relay server R1 so as to cut the established communication path (step S272).

When receiving a log-off instruction from the user in moving from state (1) to state (2), the client terminal 2A transmits a log-off registering request (REGISTER method) to the relay server R2 (step S73).

Resource Operation in State (2)

Figure 28:
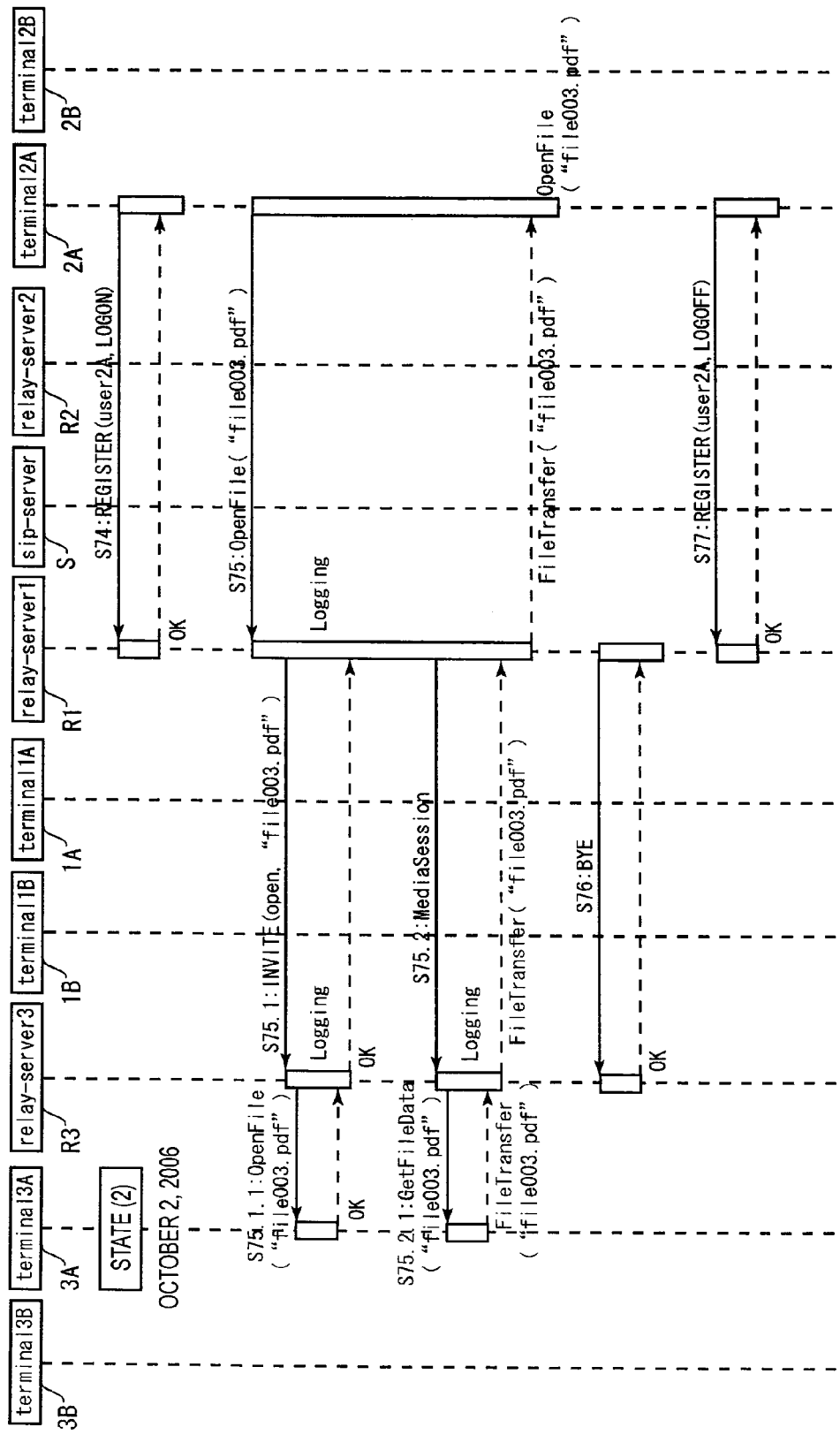
FIG. 28 is a sequence diagram illustrating a communication process in a state where the client terminal 2A is connected to the LAN1.

FIG. 28 is a sequence diagram illustrating a communication process in a state where the client terminal 2A is connected to the LAN1. State (2) corresponds to a state where a user with the client terminal 2A goes on a business trip from branch B having the LAN2 to branch A having the LAN1.

When receiving a log-on command from the user, the client terminal 2A transmits a log-on registering request (REGISTER method) to the relay server R1 (step S74).

When receiving a file opening command for "file003.pdf" from the user, the client terminal 2A transmits a file opening request (OpenFile command) to the relay server R1 (step S75).

The relay server R1 transmits a connection request (INVITE method) to the selected relay server R3 through the external server S (step S75.1). The relay server R3 transmits a file opening request to the client terminal 3A (step S75.1.1). When it can operate "file003.pdf", the client terminal 3A transmits an OK response to the relay server R3. The relay server R3 transmits the OK response to the relay server R1.

The relay server R1 transmits a MediaSession command to the relay server R3. Here, a communication path is established between the relay servers R1 and R3. The relay server R3 a file acquiring request (GetFileData command) to the client terminal 3A (step S75.2.1). The client terminal 3A copies "file003.pdf" from the resource storing unit 603 to transmits the copied file to the relay server R3. Then, "file003.pdf" is transmitted to the client terminal 2A through the relay servers R3 and R1 (FileTransfer command).

When a series of communication processes are ended, the relay server R1 transmits a cutting request (BYE method) to the relay server R3 so as to cut off the established communication path (step S76).

When receiving a log-off command from the user 25 in moving from state (2) to state (3), the client terminal 2A transmits a log-off registering request (REGISTER method) to the relay server R1 (step S77).

Resource Operation in State (3)

Figure 29:
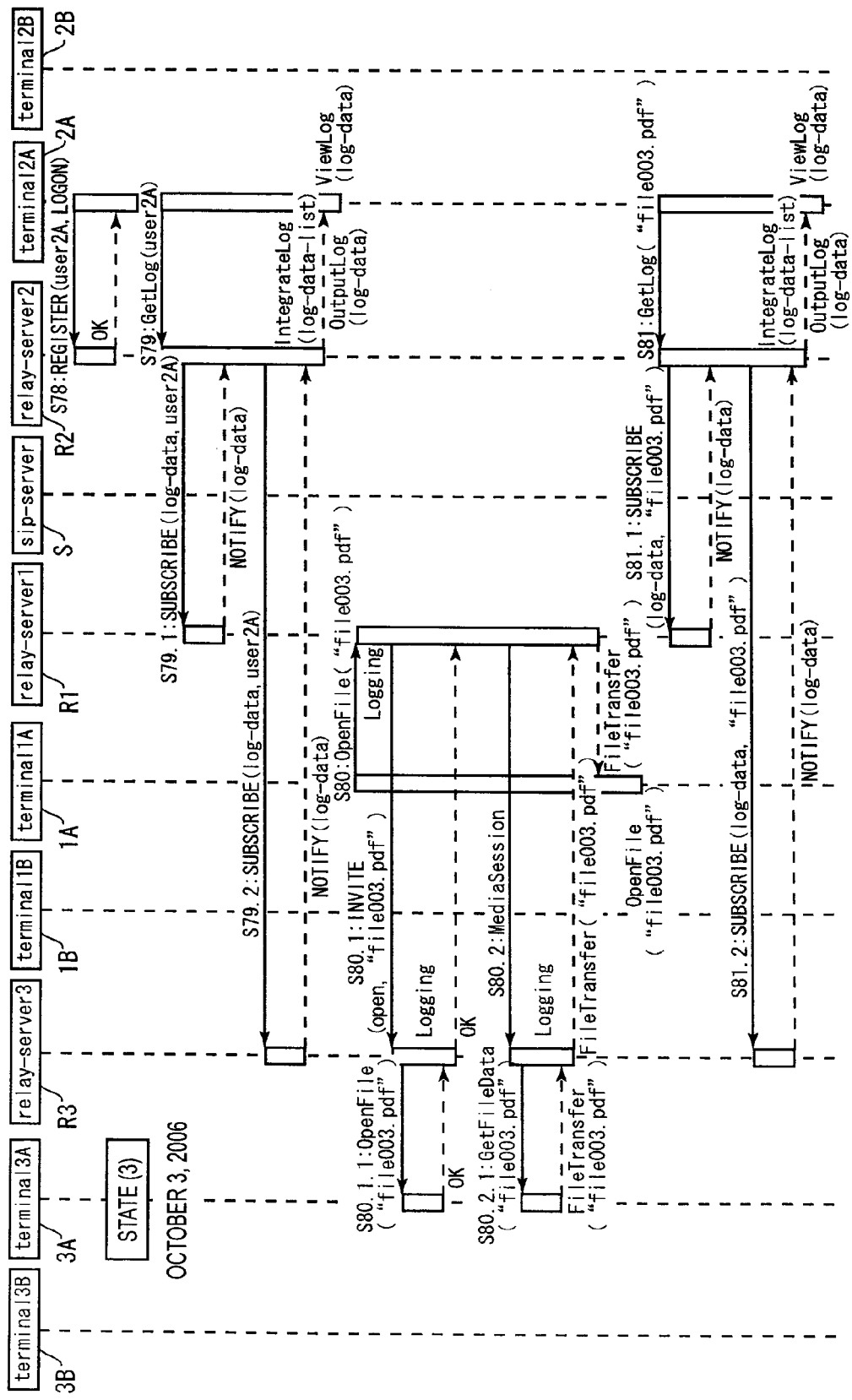
FIG. 29 is a sequence diagram illustrating a communication process in a state where the client terminal 2A is connected to the LAN2 after moving to the LAN 1.

FIG. 29 is a sequence diagram illustrating a communication process in a state where the client terminal 2A is connected to the LAN2 after it moves to the LAN1. State (3) corresponds to a state where the user of the client terminal 2A returns from branch A having the LAN1 to branch B having the LAN2 with the client terminal 2A carried.

When receiving a log-on command from the user, the client terminal 2A transmits a log-on registering request (REGISTER method) to the relay server R2 (step S78).

Here, the user outputs log information on the resource operation which the user is participated in and which is extracted during the resource operation from steps S71 to S79.2 (steps S79, S79.1, and S79.2). The log information will be described in detail later.

After the user outputs the log information, another user instructs the client terminal 1A to open "file003.pdf". At this time, the resource operation is equal to the resource operation described with reference to steps S75, S75.1, S75.1.1, S75.2, and S75.2.1 except that the client terminal 2A is replaced with the client terminal 1A (steps S80, S80.1, S80.1.1, S80.2, and S80.2.1).

Finally, the user outputs the log information on the resource operation which "file003.pdf" is associated with and which is extracted during the resource operation from steps S71 to S81.2 (steps S81, S81.1, and S81.2). The log information will be described in detail later.

Log Information Stored in Relay Servers
Log Information Stored in Relay Server R2

How the resource operation details in steps S71 to S81.2 is stored as the log information will be described now. The resource operation details transmitted and received by the relay servers R are stored as the log information in the log information DB 507 of the relay servers T shown in FIG. 26. The log information can be exchanged between the relay servers R.

In the sequences shown in FIGS. 27 to 29, the client terminal T having most frequently received the resource operating command is the client terminal 2A. Accordingly, the log information stored in the relay server R2 having most frequently transmitted and received data directly to and from the client terminal 2A will be described first.

FIG. 30 is a diagram illustrating the log information stored in the relay server R2. "Operation" denotes details of resource operations. "Resource" denotes essences of resources to be operated. "Request" denotes users having instructed to operate the resources. "Target" denotes opposite parties communicating with the relay servers R. "Method" denotes control functions in the SIP protocol.

"Real Time" denotes an elapsing time since it is instructed to operate the resources. "Date" denotes dates and times when it is instructed to operate the resources. States (1), (2), and (3) correspond to states on 2006/10/1, on 2006/10/2, and on 2006/10/3, respectively. Steps S are described in the field of "Method" of the log information shown in FIGS. 30 to 34, for the purpose of reference. The steps S correspond to steps S of the sequence diagrams shown in FIGS. 27 to 29.

First, in state (1), the user 2A (Request) makes a copy request (operation) for "file001.xls" (Resource). The operation progress of the copy request is described in "Target" and "Method". Specifically, the operation history is as follows.

The relay server R2 receives "CopyFile" (Method) from the user 2A (Target). The relay server R2 transmits and receives "INVITE-OK-FileTransfer" (Method) to and from the relay server R1 (Target). "FileTransfer" (Method) is transmitted to the user 2A (Target). "BYE-OK" (Method) is transmitted to and received from the relay server R1 (Target).

Here, "Target" is only an opposite party to communicate with the relay servers R. Accordingly, it cannot be determined from only "Target" whether the relay servers R has transmitted data to the opposite party or has received data from the opposite party. Above all, by considering "Method", the determination can be performed.

The "INVITE-OK-FileTransfer" is merged into one Method. This is because the relay server R2 does not transmit and receive another resource operation between the resource operations. "MediaSession" in step S71.2 is not described in "Method". This is because it is included in "FileTransfer".

In state (1), the user 2A (Request) makes a registration request (Operation) for a log-off. Since this log-off registering request is not the resource operation, "Resource" is empty. The relay server R2 transmits and receives "REGISTER-OK" (Method) to and from the user 2A (Target).

In state (2), no content is described in the log information stored in the relay server R2. This is because the relay server R2 is not participated at all.

In state (3), the user 2A (Request) makes a registration request (Operation) for a log-on. The user 2A (Request) outputs the log information, which will be described in detail later.

Log Information Stored in Relay Server R1

FIG. 31 is a diagram illustrating the log information stored in the relay server R1. First, in state (1), the user 2A (Request) makes a copy request (Operation) for "file001.xls" (Resource).

Here, a difference from the log information stored in the relay server R2 shown in FIG. 30 is that the relay server R2 and the user 2A are described in "Request". This means that the user having instructed to operate a resource is the user 2A but the relay server R1 has been directly instructed to operate the resource by the relay server R2.

A difference from the log information stored in the relay server R2 shown in FIG. 30 is that "INVITE", "OK", and "FileTransfer" are not merged into one "Method". This means that the relay server R1 transmits and receives another resource to and from the client terminal 1A during the resource operation.

In state (2), the user 2A (Request) makes a file opening request (Operation) for "file003.pdf" (Resource) in the course of making a registration request (Operation) for the log-on and the log-off. The log information on the resource operation is created in the same way as the log information on the resource operation of the copy request shown in FIG. 30.

In state (3), the user 2A (Request) outputs the log information. The log information stored in the relay servers R can be exchanged with the relay servers R. Accordingly, the log information on the exchange operation is stored in the relay server R1. The log information will be described in detail later.

The user 1A (Request) makes a file opening request (Operation) for "file003.pdf" (Resource). The log information on this resource operation is created in the same way as the log information on the resource operation of the copy request shown in FIG. 30.

Log Information Stored in Relay Server R3

FIG. 32 is a diagram illustrating the log information stored in the relay server R3. First, in state (2), the user 2A (Request) makes a file opening request (Operation) for "file003.pdf". In state (3), the user 1A (Request) makes a file opening request (Operation) for "file003.pdf" (Resource). The log information of the resource operations is created in the same way as the log information on the resource operation of the copy request shown in FIG. 31. In state (3), the user 2A (Request) outputs the log information. The log information will be described in detail later.

Exchange of Log Information between Relay Servers

Meaning of Log Information Exchange

The log information stored in the relay servers R2, R1, and R3 is shown in FIGS. 30, 31, and 32. Here, the user may refer to the log information shown in FIGS. 30 to 32 without any modification, or may process the log information into different types depending on the purposes. For example, the log information indicating what resource a specific user has instructed to operate may be referred to. Alternatively, the log information indicating that what operation has been instructed to a specific resource may be referred to.

In order for a user to refer to such log information, it is necessary to exchange the log information stored in the relay servers R between the relay servers R. It is not sufficient that the log information is acquired only from the relay server R directly connected to the user's client terminal T. Accordingly, means for exchanging the log information between the relay servers R will be described with reference to FIG. 29.

Output of Log Information Associated with Specific User

Steps S79, S79.1, and S79.2 shown in FIG. 29 illustrate the progress of outputting the log information associated with the user 2A. The client terminal 2A transmits a log information acquiring request (GetLog command) to the relay server R2, when receiving an instruction to acquire the log information associated with the user 2A (step S79).

The relay server R2 having received the log information acquiring request transmits the log information acquiring request (SUBSCRIBE method) to the relay servers R1 and R3 through the external server S (steps S79.1 and S79.2). The relay servers R1 and R3 having received the log information acquiring request transmits a log information notification (NOTIFY method) to the relay server R2.

The relay server R2 having received the log information from the relay servers R1 and R3 by the use of the log information notification (NOTIFY method) integrates the received log information (IntegrateLog command). Subsequently, the integrated log information is transmitted to the client terminal 2A (OutputLog command). Here, the log information associated with the user 2A is displayed on the display unit 605 of the client terminal 2A.

FIG. 33 is a diagram illustrating the log information associated with the user 2A. A difference from the log information stored in the relay servers R2, R1, and R3 and shown in FIGS. 30, 31, and 32 is that no content is described in "Request". This is because "Request" in the log information shown in FIG. 33 is the user 2A.

First, in state (1), the user 2A makes a copy request for "file001.xls" (Resource). The operation progress of this copy request is described in "Target" and "Method" in time series. A part of a specific example thereof will be described below.

In step S71, the user 2A transmits a copy request to the relay server R2. At this time, "Target" indicates that the copy request is transmitted from the user 2A to the relay server R2. That is, the transmission direction is not specified in "Target" shown in FIGS. 30 to 32, but the transmission direction is specified in "Target" shown in FIG. 33.

In step S71.1, the relay server R2 transmits a connection request to the relay server R1. "Target" at this time indicates that the connection request is transmitted from the relay server R2 to the relay server R1. Here, the user 2A is not described in "Target" in step S71. This is because the log information shown in FIG. 33 is log information associated with the user 2A and thus it is clear that the user 2A should be described in "Target".

As shown in FIGS. 30 and 31, the log information on the connection request in step S71.1 is stored in the relay servers R1 and R2 together. However, when the log information is exchanged between the relay servers R, it is not necessary to particularly output the log information substantially overlapping in details in FIG. 33. Regarding the log information shown in FIGS. 33 and 34, when the log information on the resource operation through the plural relay servers R is output, the log information substantially overlapping in details is integrated and output and thus the overlapping log information is not output.

In step S71.1.1, the relay server R1 transmits a copy request to the user 1A. At this time, "CopyFile-OK" is merged into one "Method". This is because another resource operation is not transmitted and received during the resource operation. In step S71.2, "MediaSession" is not described in "Method." This is because it is included in "FileTransfer."

Although a part of the operation progress of the copy request in state (1) has been described, the operation progress posterior thereto can be considered in the same way. Since the log information shown in FIG. 33 is acquired in steps S79, S79.1, and S79.2, the operation progress up to the steps is included therein.

It should be noted that the client terminal 2A is connected directly to the relay server R1 in state (2), not to the relay server R2. However, the user 2A can acquire the log information on the operation progress of the file opening request in state (2), even in the state where the client terminal 2A is directly connected to the relay server R2.

This is possible because the log information is exchanged between the relay servers R. In this way, the log information on the resource operation performed in any LAN can be output from any LAN. It is possible to output the log information associated with only a specific user.

Output of Log Information Associated with Specific Resource

Steps S81, S81.1, and S81.2 shown in FIG. 29 show the progress of outputting the log information associated with the resource of "file003.pdf". The progress is similar to the progress of steps S79, S79.1, and S79.2.

FIG. 34 is a diagram illustrating the log information associated with the resource of "file003.pdf". A difference from the log information shown in FIGS. 30, 31, and 32 and stored in the relay servers R2, R1, and R3, respectively, is that there is no description in "Resource". This is because "Resource" in the log information shown in FIG. 34 all corresponds to "file003.pdf".

First, in state (2), the user 2A (Request) makes a file opening request (Operation) for "file003.pdf". Then, the user 1A (Request) makes a file opening request (Operation) for the same "file003.pdf".

Finally, the user 2A (Request) outputs the log information. The operation progress is described in "Target" and "Method" in time series and can be considered as being similar to the operation progress described with reference to steps S79, S79.1, and S79.2. Since the log information shown in FIG. 34 is acquired in steps S81, S81.1, and S81.2, the operation progress up to the steps are all included therein.

As described with reference to steps S79, S79.1, and S79.2, it should be noted that the client terminal 2A is connected directly to the relay server R1 in state (2), not to the relay server R2. However, the user 2A can acquire the log information on the operation progress of the file opening request in state (2), even in the state where the client terminal 2A is directly connected to the relay server R2.

In state (3), the file opening request is made by the client terminal 1A connected to the relay server R1, but is not directly associated with the client terminal 2A connected to the relay server R2. However, the user 2A can acquire the log information on the operation progress of the file opening request.

This is possible because the log information is exchanged between the relay servers R. In this way, the log information on the resource operation performed in any LAN can be output from any LAN. It is possible to output the log information associated with only a specific user.

Modified Example of Setting Whether Specific Log Information Should be Exchanged At the time of outputting the log information shown in FIGS. 33 and 34, all the log information stored in the relay servers R is exchanged between the relay servers R. However, this may be not preferable in some cases. In this case, even when a request for exchanging the log information stored in a different relay server R is transmitted from a relay server R to the different server R, the different relay server R can reject the request.

For example, other users (relevant companies of branch A, homeworkers, and the like) connected to only branch A having the LAN1 but not belonging to the network shown in FIG. 1 are considered. Regarding the other users, it is possible to establish that a different branch cannot open the log information stored in a relay server R of another different branch.

While the invention has been described with respect to preferred embodiments thereof, it will apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A relay server that is connected to a LAN and that can communicate with a relay server of a different LAN, the relay server comprising:
   an account information registering unit including hardware and software that stores account information including information on client terminals connected to the LAN;
   a relay group information registering unit that stores relay group information including information on a group of relay servers permitting access to each other; and
   a shared resource information registering unit that stores shared resource information including information on resources and information on the client terminals sharing the resources; wherein
   when an operation command for a resource, which can be operated by a client terminal connected to the different terminal, is received from the client terminal stored in the account information registering unit on the basis of the shared resource information, the operation of the resource is relayed on the basis of the relay group information;
   the shared resource information includes information indicating essences of the resources, information on owner client terminals which can operate the essences of the resources, and information on user client terminals which can indirectly operate the essences of the resources through the owner client terminals; and
   the relay server further comprises:
      a terminal selecting unit that selects the owner client terminal of a resource on the basis of the shared resource information when receiving an operation command for the resource, which can be operated by the client terminal connected to the different LAN, from the user client terminal stored in the account information registering unit; and
      an operation command transmitting unit that selects a relay server connected to the same LAN as the selected owner client terminal is connected on the basis of the relay group information and that transmits the operation command for the resource to the owner client terminal through the selected relay server.

2. A relay communication system, comprising:
   a plurality of LANs; and
   a relay server and client terminals connected to each of the plurality of LANs; wherein
   the relay server includes:
      an account information registering unit that stores account information including information on the client terminals connected to one LAN;
      a relay group information registering unit that stores relay group information including information on a group of relay servers permitting access to each other; and
      a shared resource information registering unit that stores shared resource information including information on resources and information on the client terminals sharing the resources;
   when receiving an operation command for a resource, which can be operated by a client terminal connected to the different terminal, from the client terminal stored in the account information registering unit on the basis of the shared resource information, the relay server relays the operation of the resource on the basis of the relay group information;

the client terminal connected to one LAN is allowed to indirectly operate the resource held by the client terminal connected to a different LAN;

the shared resource information includes information indicating essences of the resources, information on owner client terminals which can operate the essences of the resources, and information on user client terminals which can indirectly operate the essences of the resources through the owner client terminals; and the relay server further comprises:
 a terminal selecting unit that selects the owner client terminal of a resource on the basis of the shared resource information when receiving an operation command for the resource, which can be operated by the client terminal connected to the different LAN, from the user client terminal stored in the account information registering unit; and
 an operation command transmitting unit that selects a relay server connected to the same LAN as the selected owner client terminal is connected on the basis of the relay group information and that transmits the operation command for the resource to the owner client terminal through the selected relay server.

3. A relay server that is connected to a LAN and that can communicate with a relay server connected to a different LAN, the relay server comprising:
 an account information registering unit including hardware and software that stores account information including information on client terminals connected to the LAN;
 a relay group information registering unit that stores relay group information including information on a group of relay servers permitting communications with each other; and
 a shared resource information registering unit that stores shared resource information including information on resources and information on the client terminals sharing the resources; wherein
 when an operation command for a resource, which can be operated by a client terminal connected to the different terminal, is received from the client terminal stored in the account information registering unit on the basis of the shared resource information, the operation of the resource is relayed on the basis of the relay group information;
 the shared resource information includes information indicating essences of the resources, information on owner client terminals which can operate the essences of the resources, and information on user client terminals which can indirectly operate the essences of the resources through the owner client terminals; and
 the relay server further comprises:
  a log information storing unit that stores log information including information on the operation command;
  a log information exchanging unit that exchanges the log information between the group of relay servers on the basis of the relay group information;
  a terminal selecting unit that selects the owner client terminal of a resource on the basis of the shared resource information when receiving an operation command for the resource, which can be operated by the client terminal connected to the different LAN, from the user client terminal stored in the account information registering unit; and
  an operation command transmitting unit that selects a relay server connected to the same LAN as the selected owner client terminal is connected on the basis of the relay group information and that transmits the operation command for the resource to the owner client terminal through the selected relay server.

4. The relay server according to claim 3, further comprising a first log information outputting unit that outputs the log information associated with a specific client terminal among the log information which is exchanged between the group of relay servers.

5. The relay server according to claim 3, further comprising a second log information outputting unit that outputs the log information associated with a specific resource among the log information which is exchanged between the group of relay servers.

6. The relay server according to claim 3, further comprising a log information exchange setting unit that sets whether specific log information should be exchanged between the group of relay servers every relay server.

7. The relay server according to claim 3, further comprising a log information integrating unit that integrates and outputs the log information overlapping with each other in response to the operation command passing through the plural relay servers among the log information which is exchanged between the group of relay servers.

8. A management method using a relay server that is connected to a LAN and that can communicate with a relay server of a different LAN, the management method comprising:
 storing account information including information on client terminals connected to the LAN;
 storing relay group information including information on a group of relay servers permitting access to each other; and
 storing shared resource information including information on resources and information on the client terminals sharing the resources; wherein
 when an operation command for a resource, which can be operated by a client terminal connected to the different terminal, is received from the client terminal stored in the registering of the account information on the basis of the shared resource information, the operation of the resource is relayed on the basis of the relay group information;
 the shared resource information includes information indicating essences of the resources, information on owner client terminals which can operate the essences of the resources, and information on user client terminals which can indirectly operate the essences of the resources through the owner client terminals; and
 the management method further comprises:
  selecting the owner client terminal of a resource on the basis of the shared resource information when receiving an operation command for the resource, which can be operated by the client terminal connected to the different LAN, from the user client terminal stored in the registering of the account information; and
  selecting a relay server connected to the same LAN as the selected owner client terminal is connected on the basis of the relay group information and transmitting the operation command for the resource to the owner client terminal through the selected relay server.

9. A management method of a relay communication system having a plurality of LANs and a relay server and client terminals connected to each of the plurality of LANs, the management method comprising:

storing account information including information on the client terminals connected to one LAN;

storing relay group information including information on a group of relay servers permitting access to each other; and storing shared resource information including information on resources and information on the client terminals sharing the resources; wherein when receiving an operation command for a resource, which can be operated by a client terminal connected to the different terminal, from the client terminal stored in the registering of the account information on the basis of the shared resource information, the relay server relays the operation of the resource on the basis of the relay group information;

the client terminal connected to one LAN is allowed to indirectly operate the resource held by the client terminal connected to a different LAN;

the shared resource information includes information indicating essences of the resources, information on owner client terminals which can operate the essences of the resources, and information on user client terminals which can indirectly operate the essences of the resources through the owner client terminals; and the management method further comprises:

selecting the owner client terminal of a resource on the basis of the shared resource information when receiving an operation command for the resource, which can be operated by the client terminal connected to the different LAN, from the user client terminal stored in the registering of the account information; and selecting a relay server connected to the same LAN as the selected owner client terminal is connected on the basis of the relay group information and transmitting the operation command for the resource to the owner client terminal through the selected relay server.

10. A management method using a relay server that is connected to a LAN and that can communicate with a relay server connected to a different LAN, the management method comprising:

storing account information including information on client terminals connected to the LAN;

storing relay group information including information on a group of relay servers permitting communications with each other; and storing shared resource information including information on resources and information on the client terminals sharing the resources; wherein when an operation command for a resource, which can be operated by a client terminal connected to the different terminal, is received from the client terminal stored in the registering of the account information on the basis of the shared resource information, the operation of the resource is relayed on the basis of the relay group information;

the shared resource information includes information indicating essences of the resources, information on owner client terminals which can operate the essences of the resources, and information on user client terminals which can indirectly operate the essences of the resources through the owner client terminals; and the management method further comprises:

storing log information including information on the operation command;

exchanging the log information between the group of relay servers on the basis of the relay group information;

selecting the owner client terminal of a resource on the basis of the shared resource information when receiving an operation command for the resource, which can be operated by the client terminal connected to the different LAN, from the user client terminal stored in the registering of the account information; and selecting a relay server connected to the same LAN as the selected owner client terminal is connected on the basis of the relay group information and transmitting the operation command for the resource to the owner client terminal through the selected relay server.

11. The management method according to claim 10, further comprising outputting the log information associated with a specific client terminal among the log information which is exchanged between the group of relay servers.

12. The management method according to claim 10, further comprising outputting the log information associated with a specific resource among the log information which is exchanged between the group of relay servers.

13. The management method according to claim 10, further comprising setting whether specific log information should be exchanged between the group of relay servers every relay server.

14. The management method according to claim 10, further comprising integrating and outputting the log information overlapping with each other in response to the operation command passing through the plural relay servers among the log information which is exchanged between the group of relay servers.

* * * * *